No. 786,963. PATENTED APR. 11, 1905.
A. H. EMERY.
MOUNTING AND OPERATING GUNS.
APPLICATION FILED APR. 13, 1893. RENEWED NOV. 22, 1893.
21 SHEETS—SHEET 1.
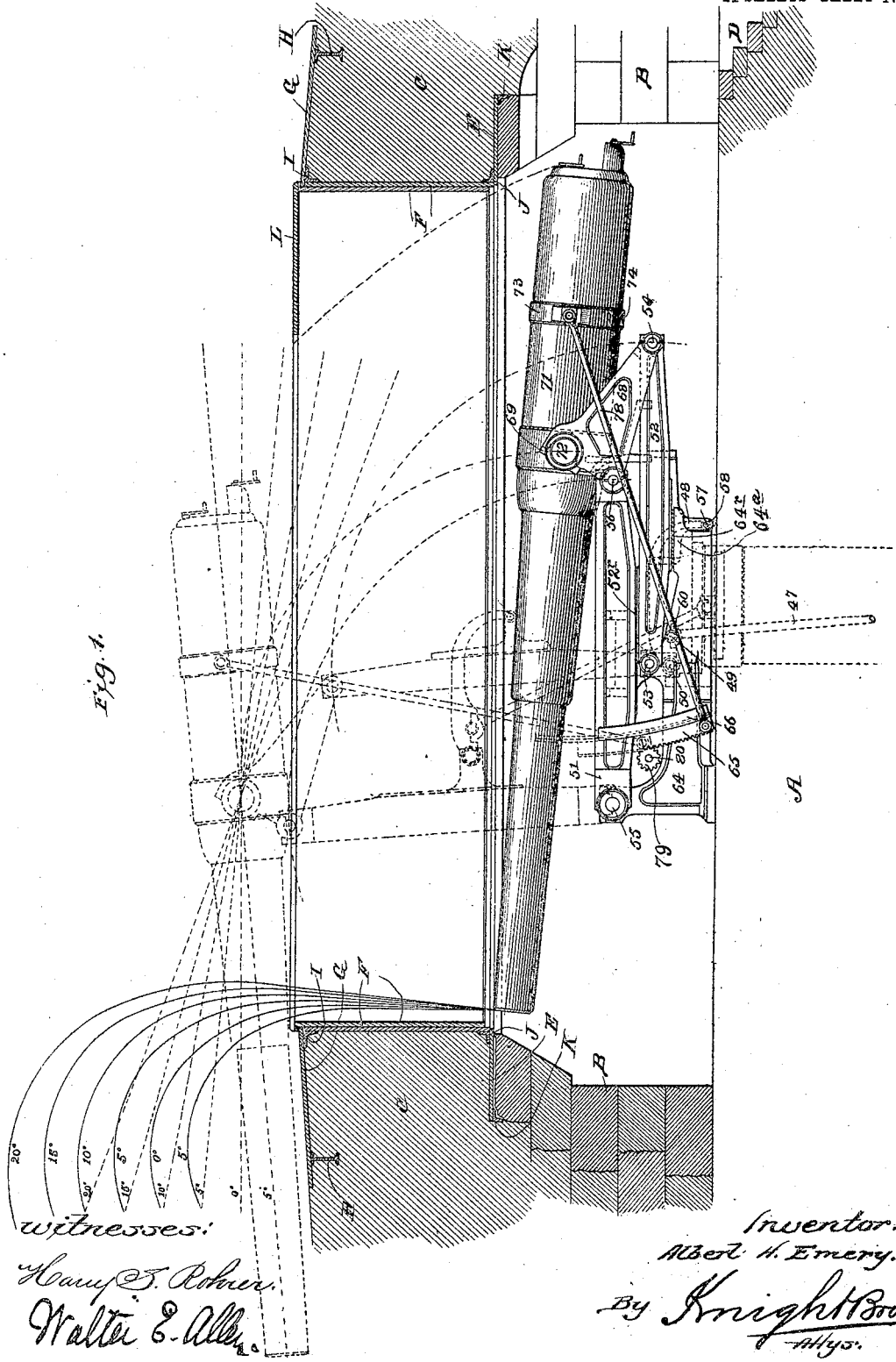

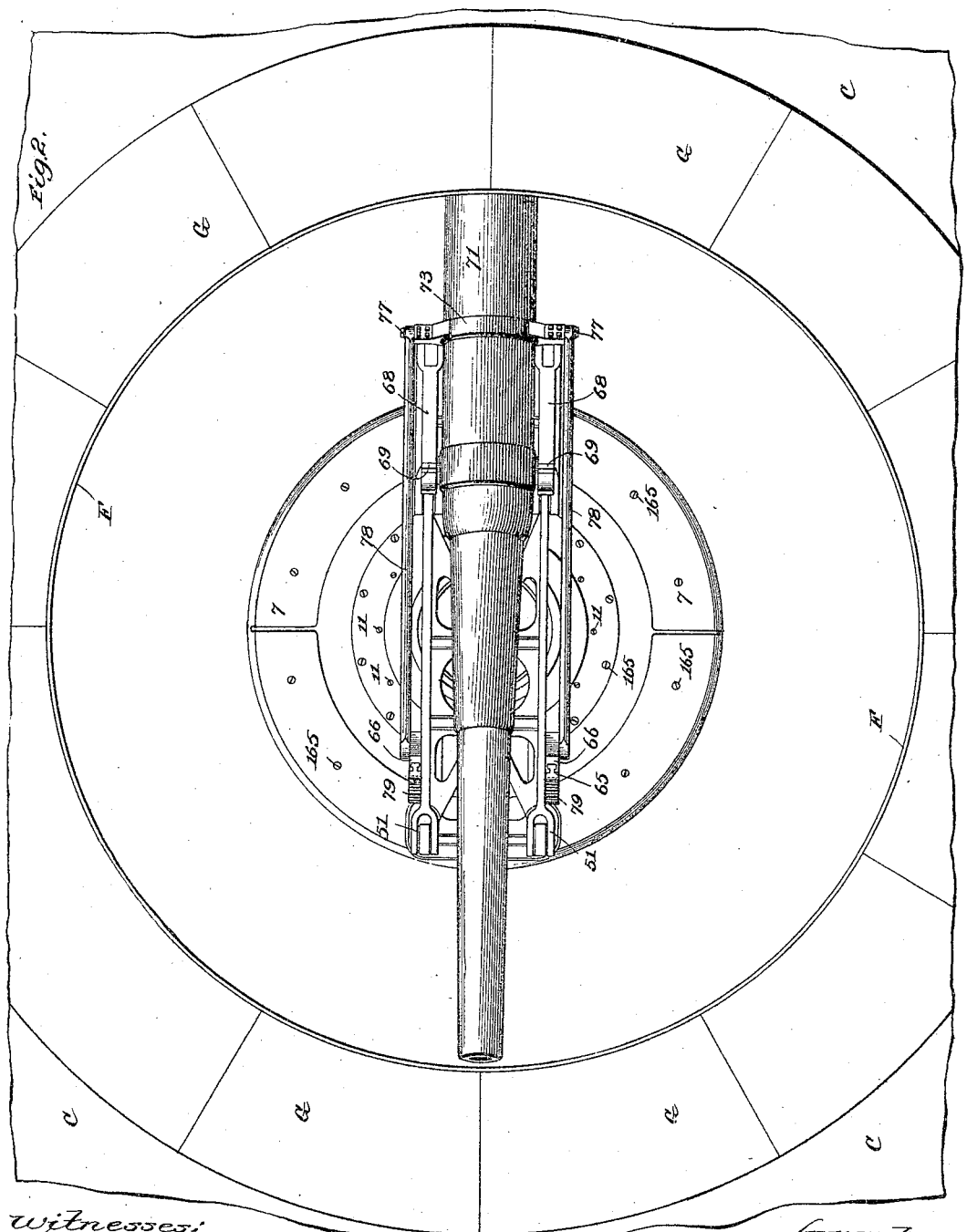

No. 786,963. PATENTED APR. 11, 1905.
A. H. EMERY.
MOUNTING AND OPERATING GUNS.
APPLICATION FILED APR. 13, 1893. RENEWED NOV. 22, 1893.
21 SHEETS—SHEET 3.
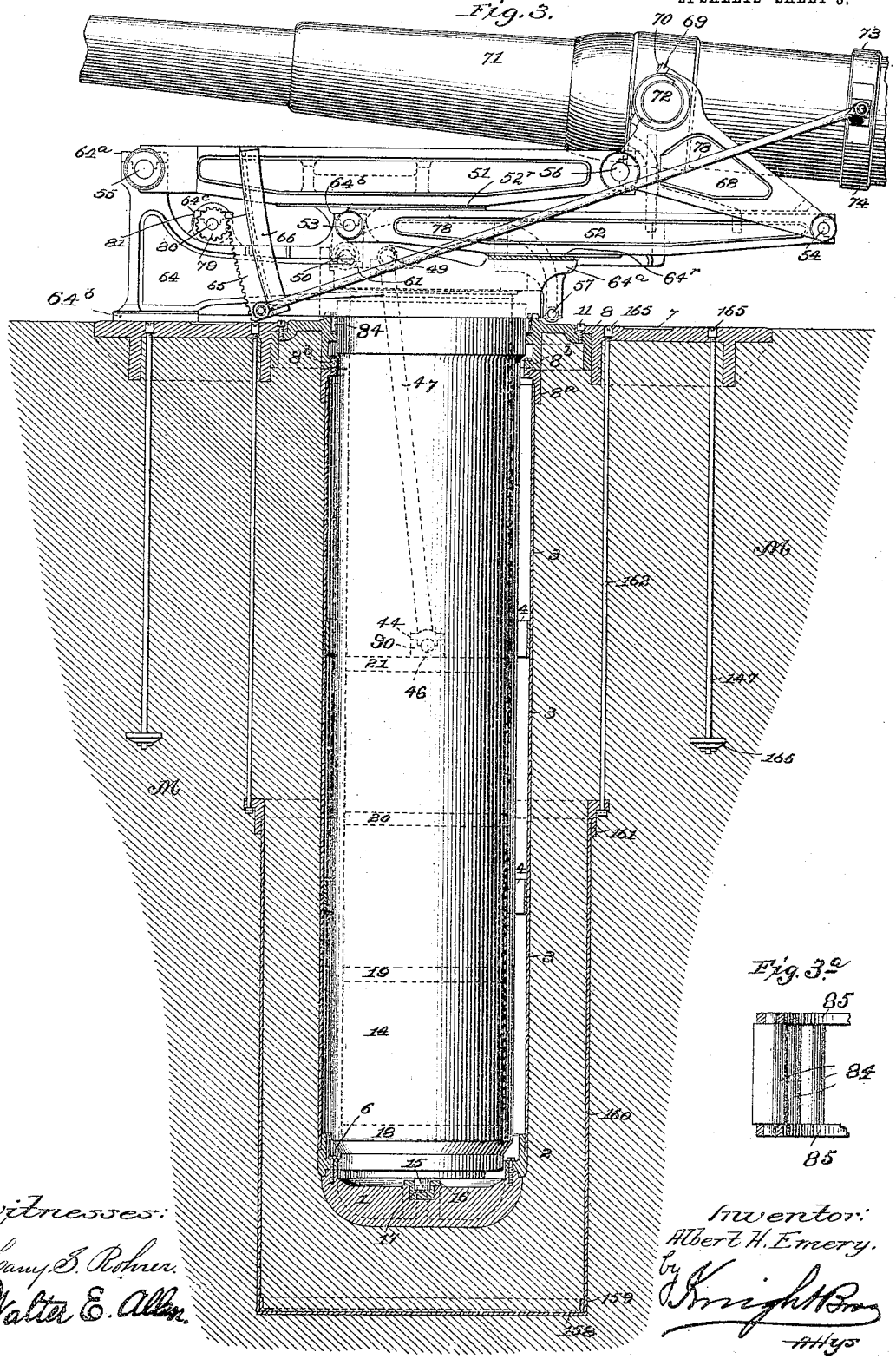

No. 786,963. PATENTED APR. 11, 1905.
A. H. EMERY.
MOUNTING AND OPERATING GUNS.
APPLICATION FILED APR. 13, 1893. RENEWED NOV. 22, 1893.
21 SHEETS—SHEET 4.
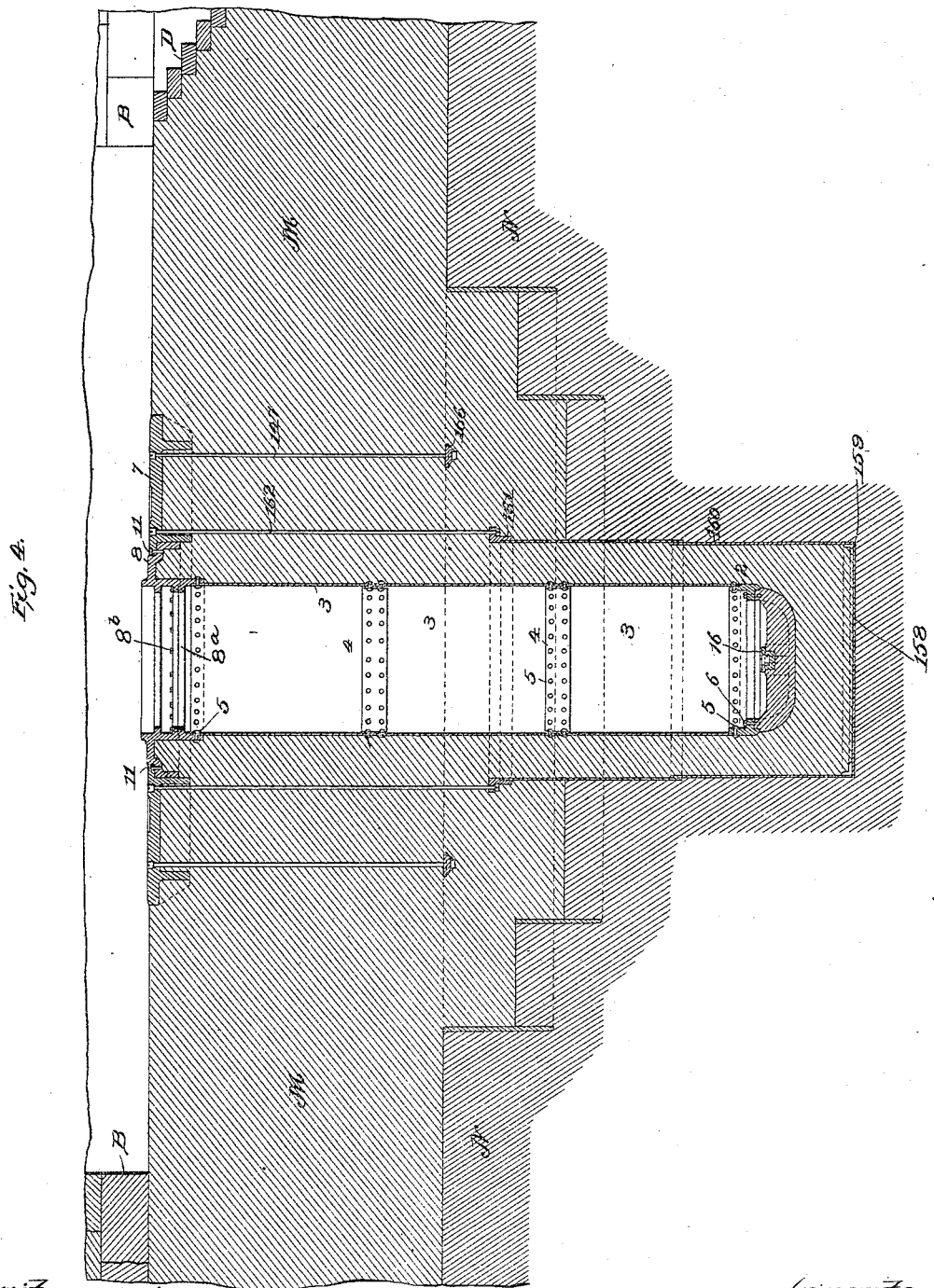

No. 786,963. PATENTED APR. 11, 1905.
A. H. EMERY.
MOUNTING AND OPERATING GUNS.
APPLICATION FILED APR. 13, 1893. RENEWED NOV. 22, 1893.
21 SHEETS—SHEET 5.
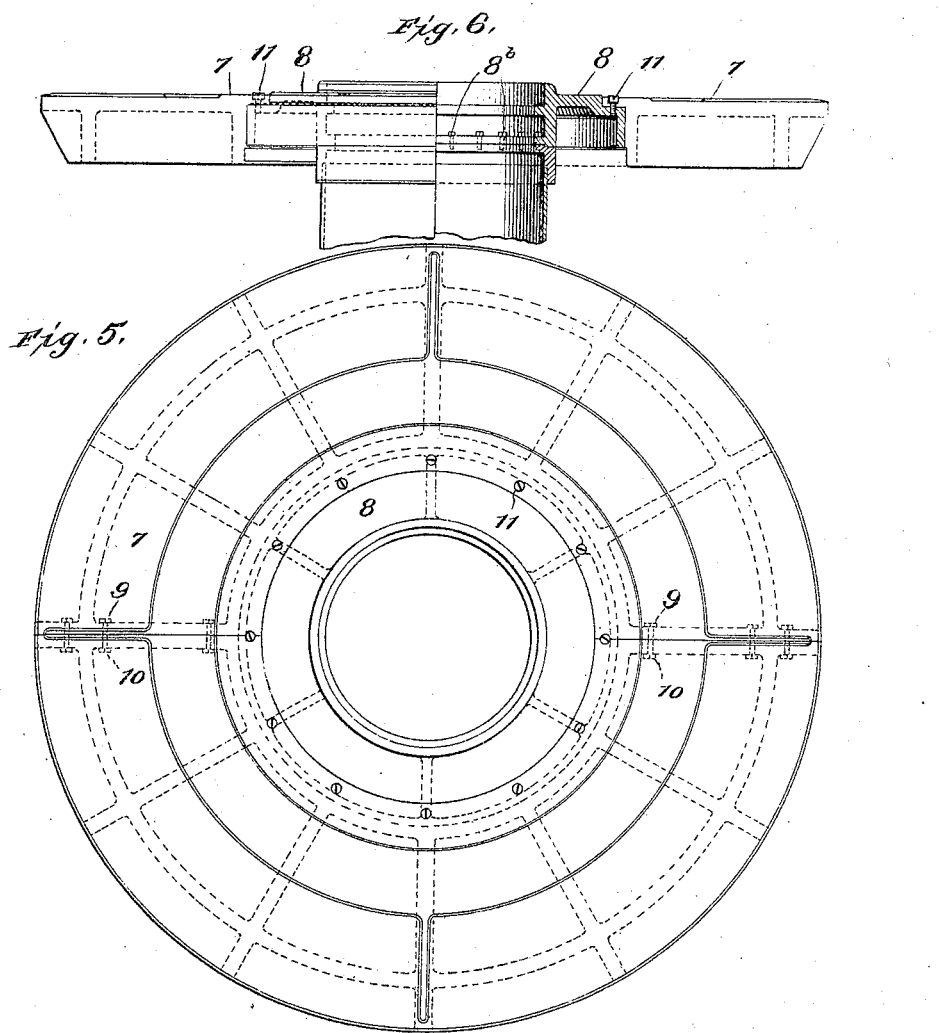
Witnesses,
Edward L. Knight.
Walter E. Allen.
Inventor
Albert H. Emery.
By Knight Bros
Attys.

No. 786,963. PATENTED APR. 11, 1905.
A. H. EMERY.
MOUNTING AND OPERATING GUNS.
APPLICATION FILED APR. 13, 1893. RENEWED NOV. 22, 1893.
21 SHEETS—SHEET 6.
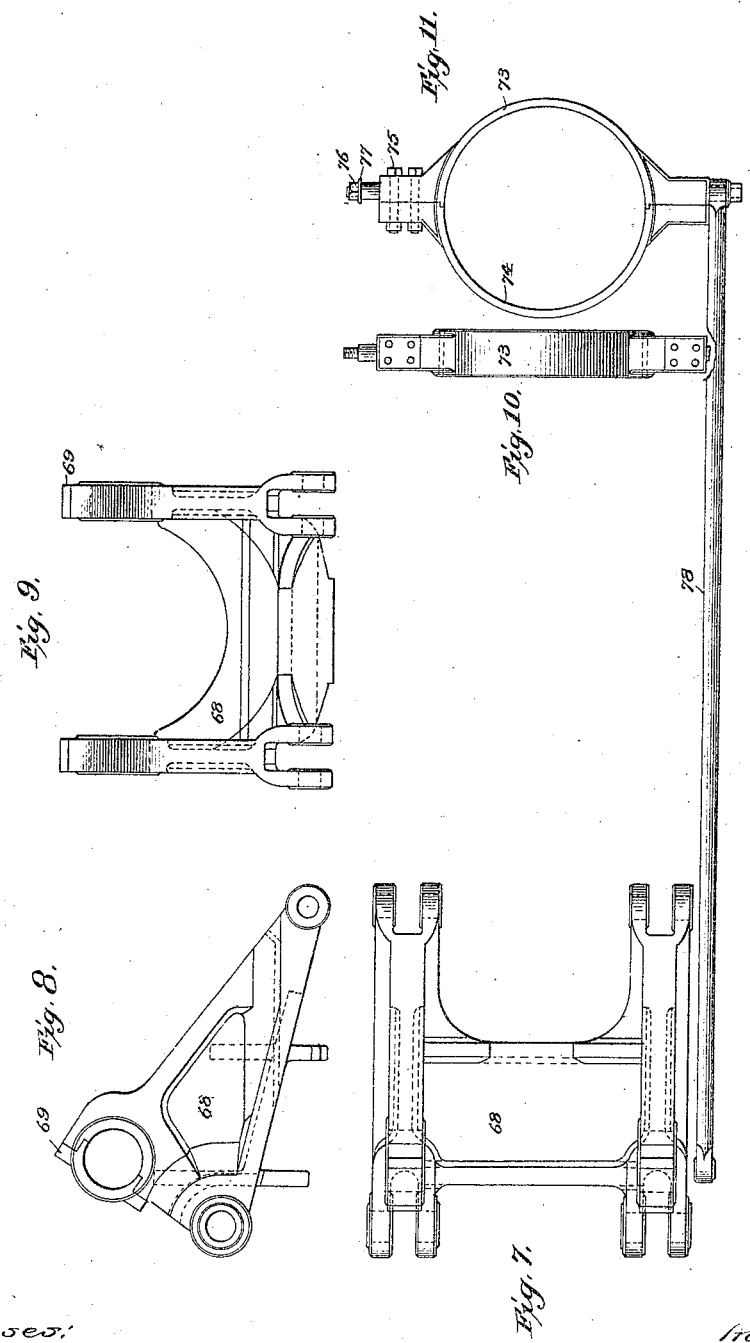

No. 786,963. PATENTED APR. 11, 1905.
A. H. EMERY.
MOUNTING AND OPERATING GUNS.
APPLICATION FILED APR. 13, 1893. RENEWED NOV. 22, 1893.
21 SHEETS—SHEET 7.
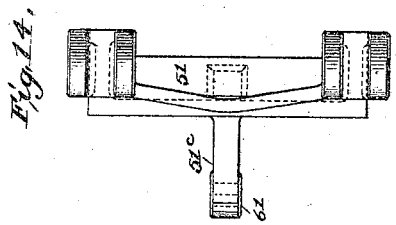
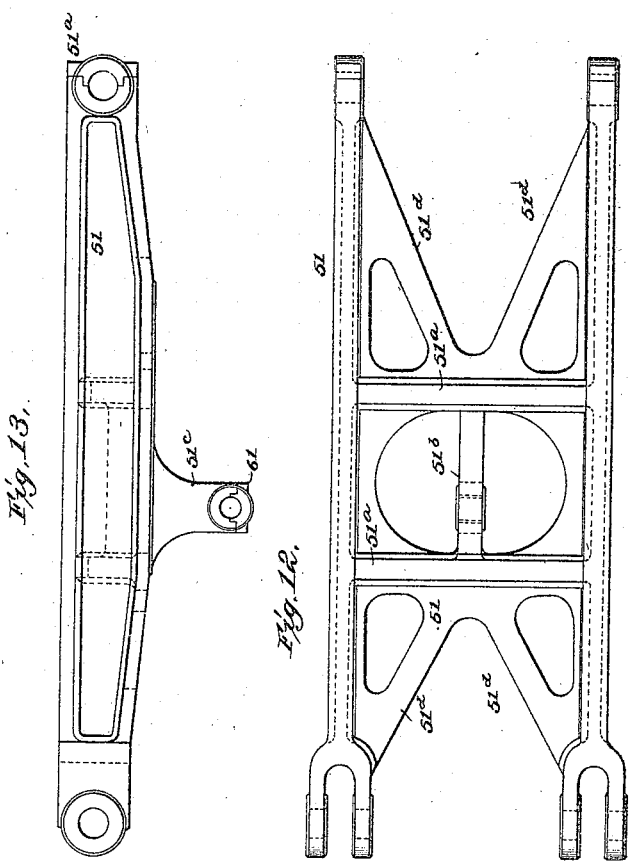
Witnesses:
Harry D. Rohrer
Edward D. Knight
Inventor:
Albert H. Emery
By Knight Bros
Attys.

No. 786,963. PATENTED APR. 11, 1905.
A. H. EMERY.
MOUNTING AND OPERATING GUNS.
APPLICATION FILED APR. 13, 1893. RENEWED NOV. 22, 1893.
21 SHEETS—SHEET 8.
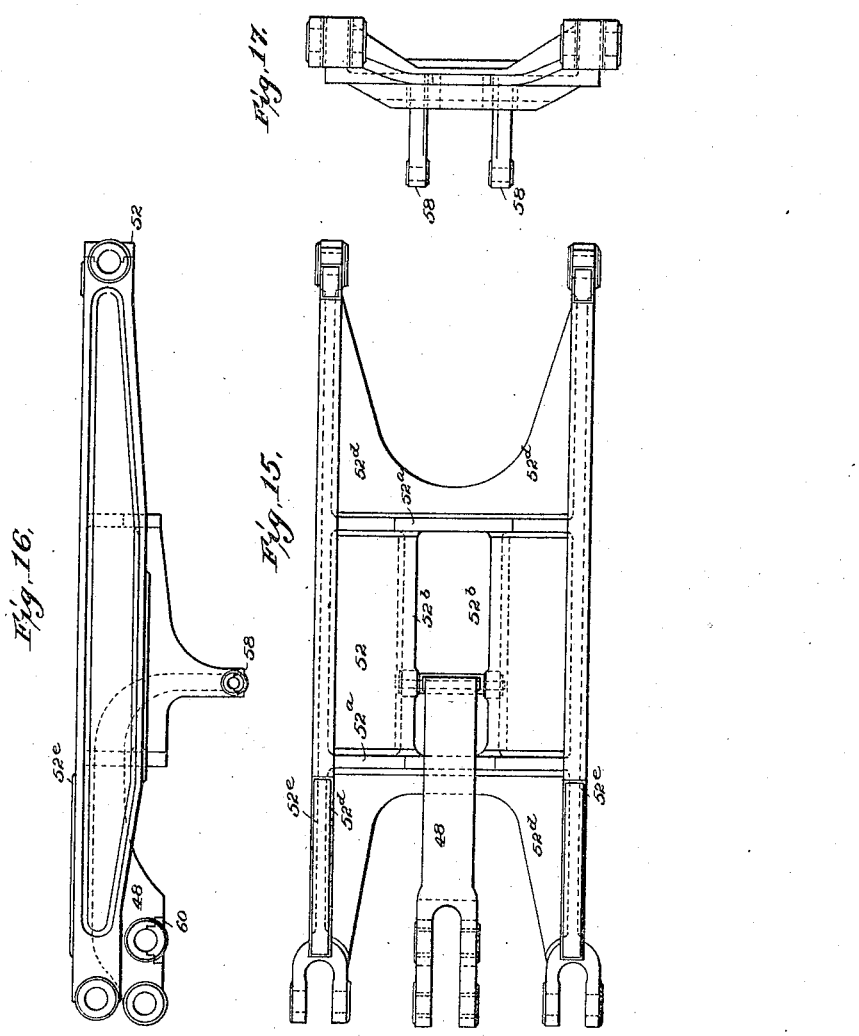

No. 786,963. PATENTED APR. 11, 1905.
A. H. EMERY.
MOUNTING AND OPERATING GUNS.
APPLICATION FILED APR. 13, 1893. RENEWED NOV. 22, 1893.
21 SHEETS—SHEET 9.
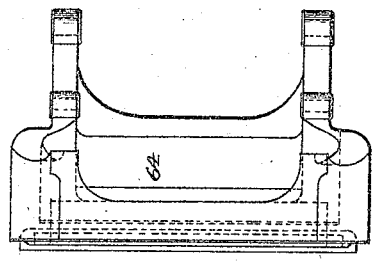
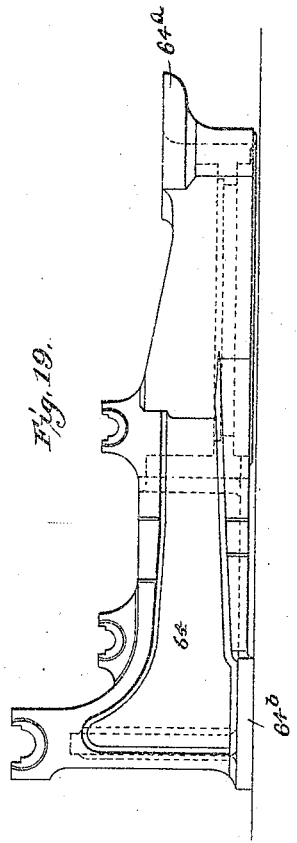
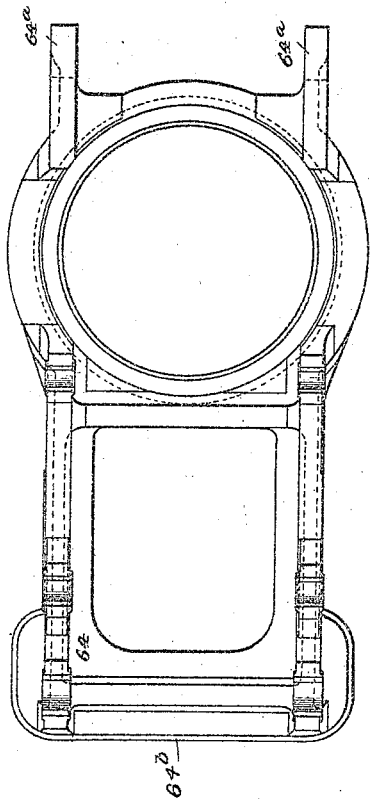
Witnesses:
Harry T. Rohrer.
Edward L. Knight.
Inventor
Albert H. Emery.
By Knight Bro
Attys.

No. 786,963. PATENTED APR. 11, 1905.
A. H. EMERY.
MOUNTING AND OPERATING GUNS.
APPLICATION FILED APR. 13, 1893. RENEWED NOV. 22, 1893.
21 SHEETS—SHEET 10.
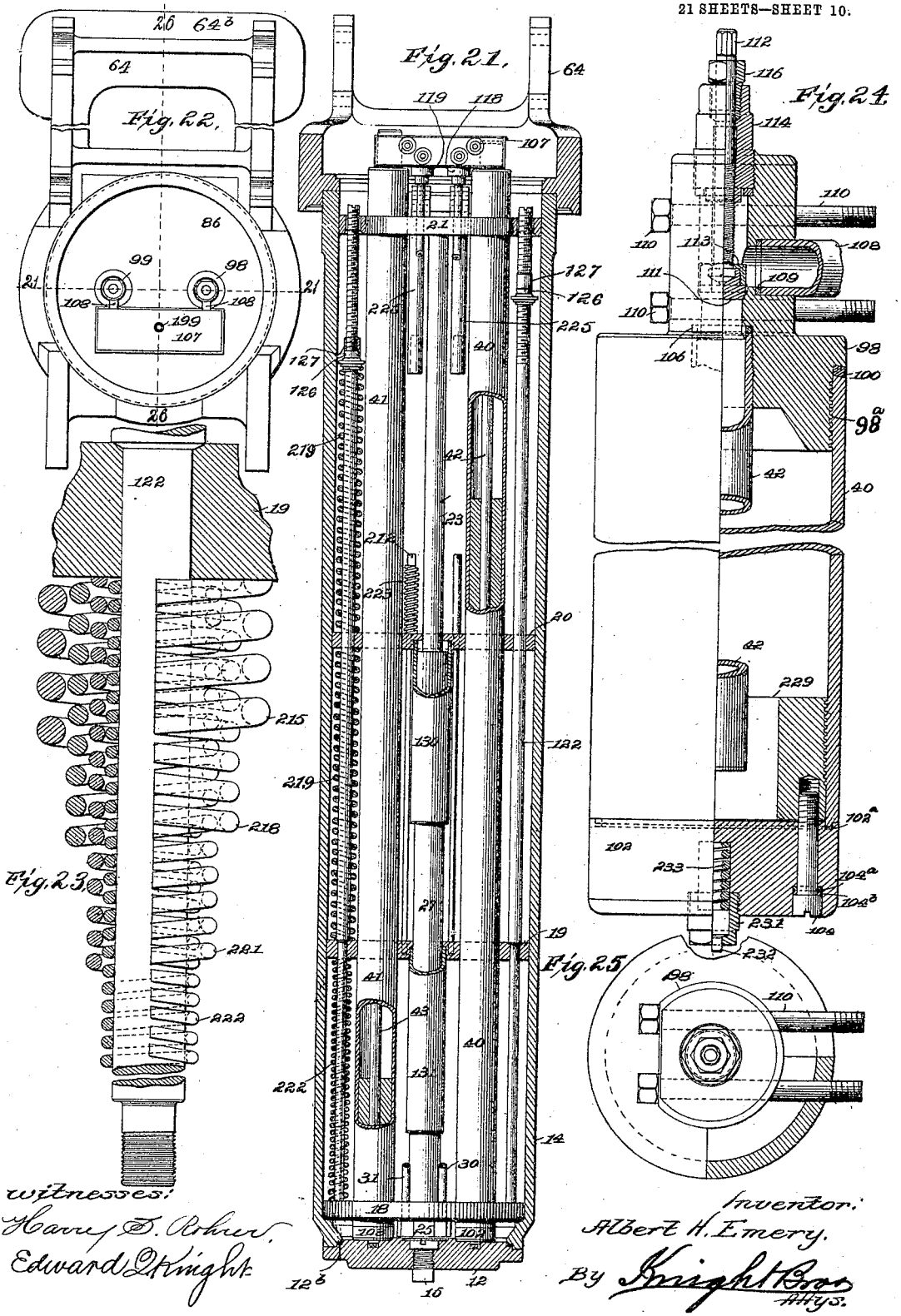
Witnesses:
Harry D. Asher
Edward Q. Knight
Inventor:
Albert H. Emery.
By Knight Bros.
Attys.

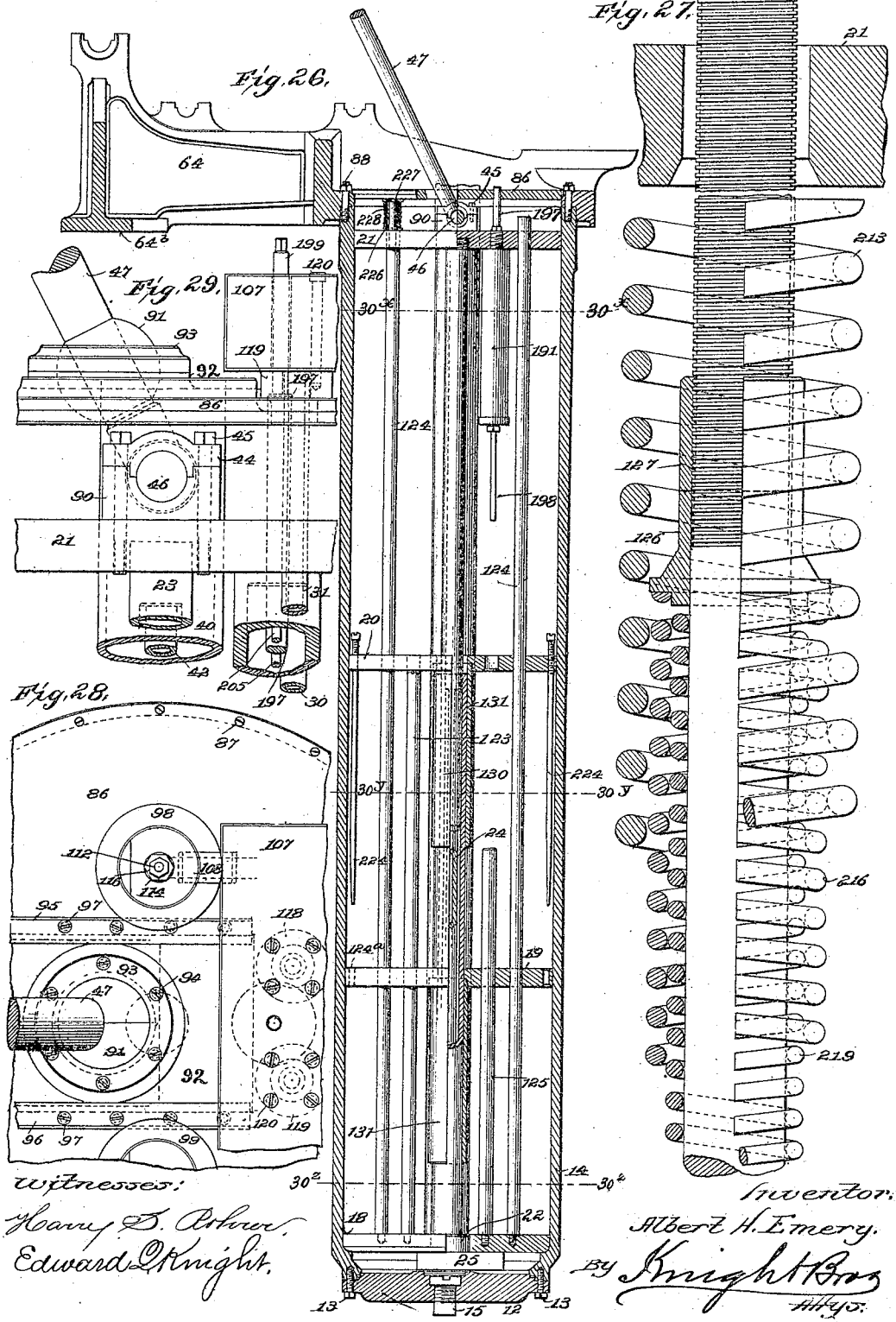

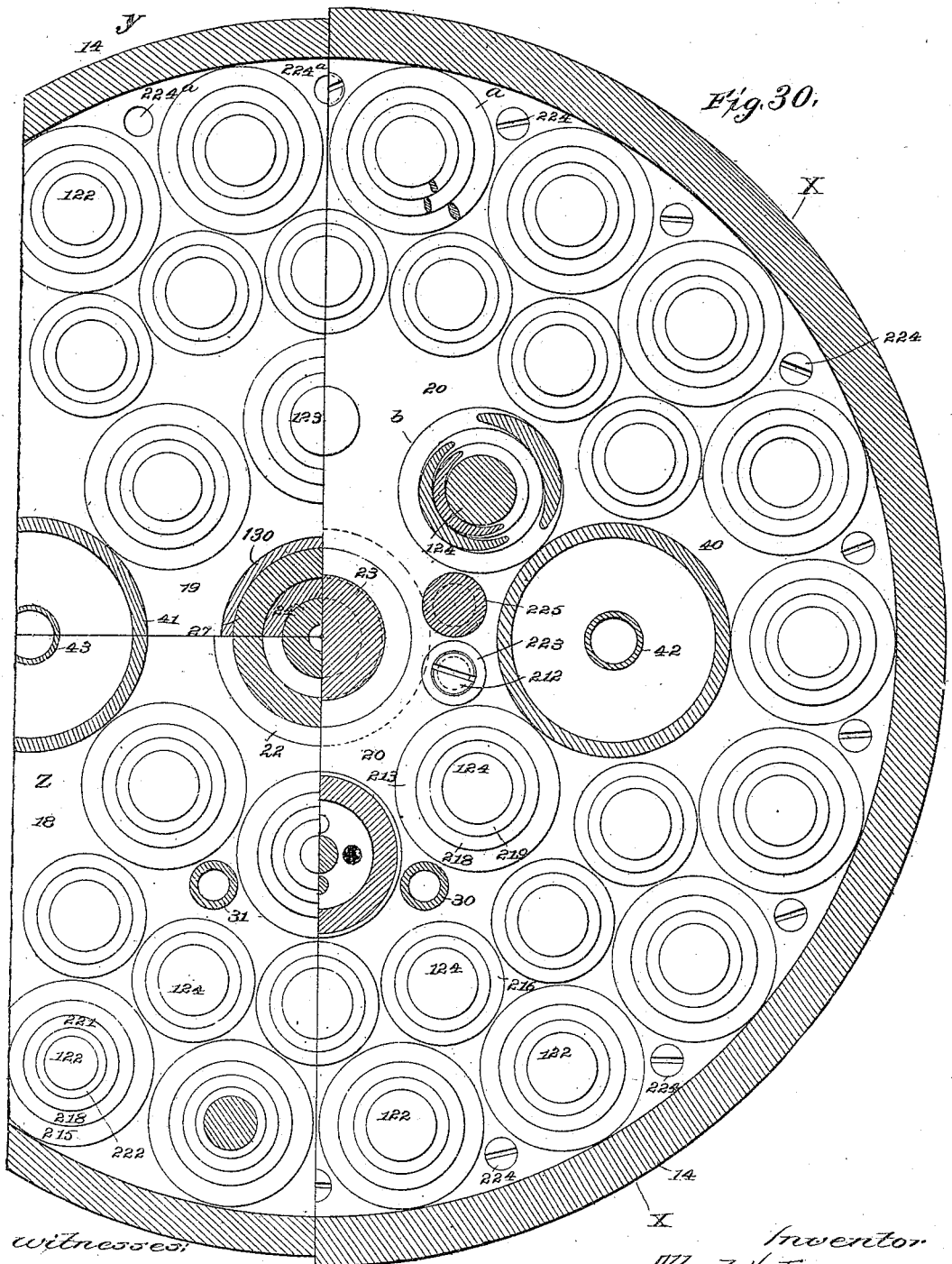

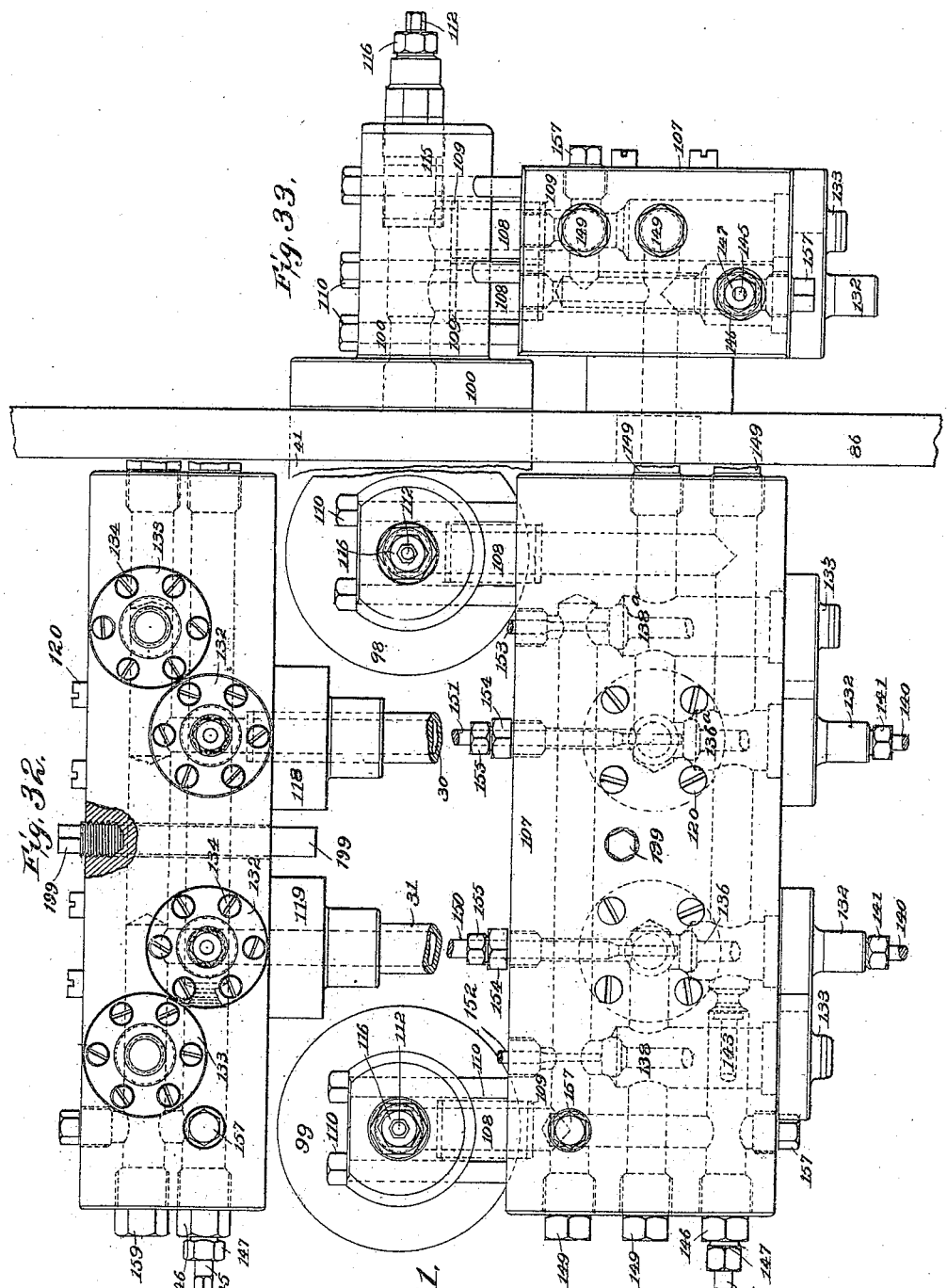

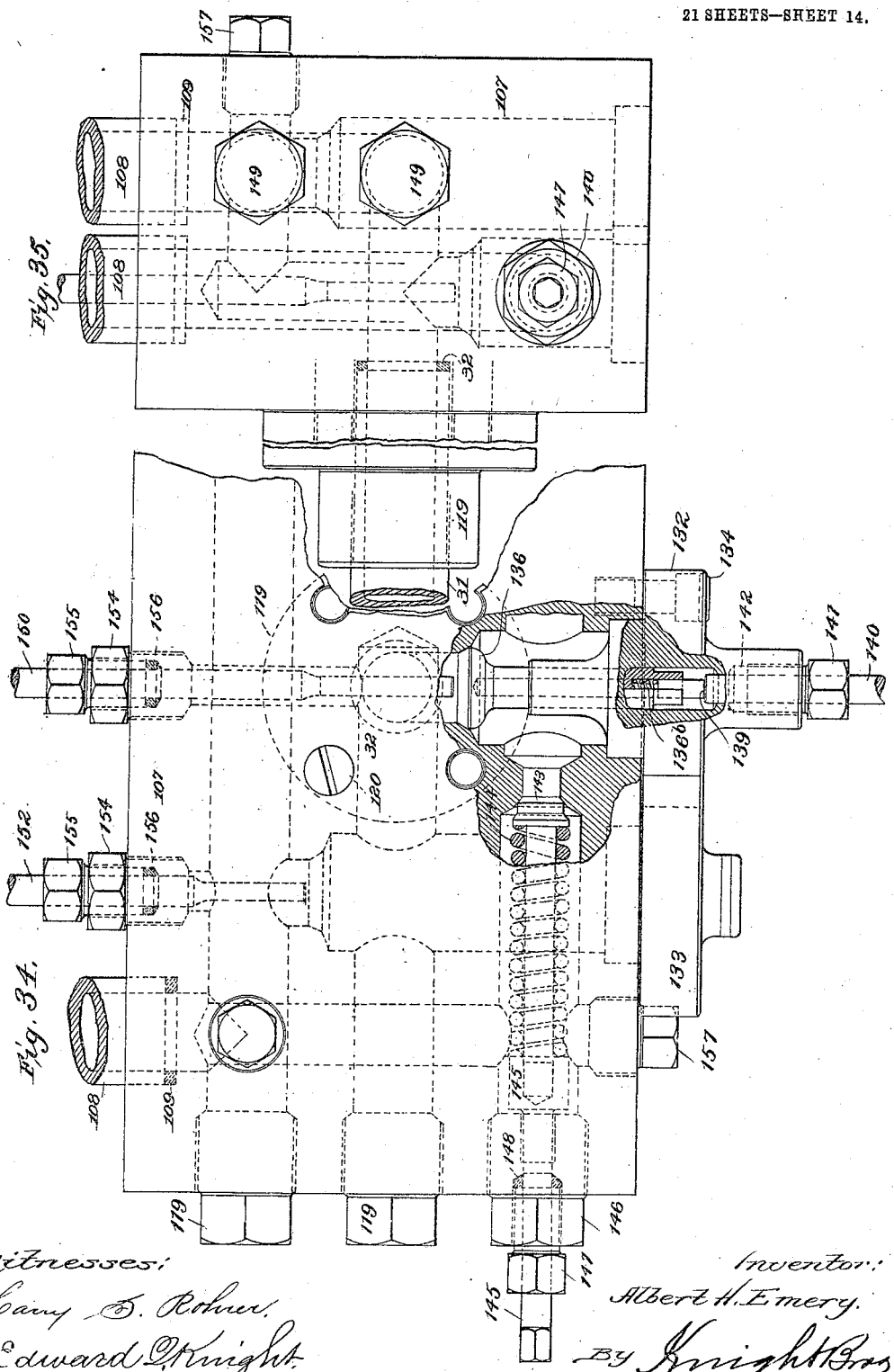

No. 786,963. PATENTED APR. 11, 1905.
A. H. EMERY.
MOUNTING AND OPERATING GUNS.
APPLICATION FILED APR. 13, 1893. RENEWED NOV. 22, 1893.
21 SHEETS—SHEET 15.
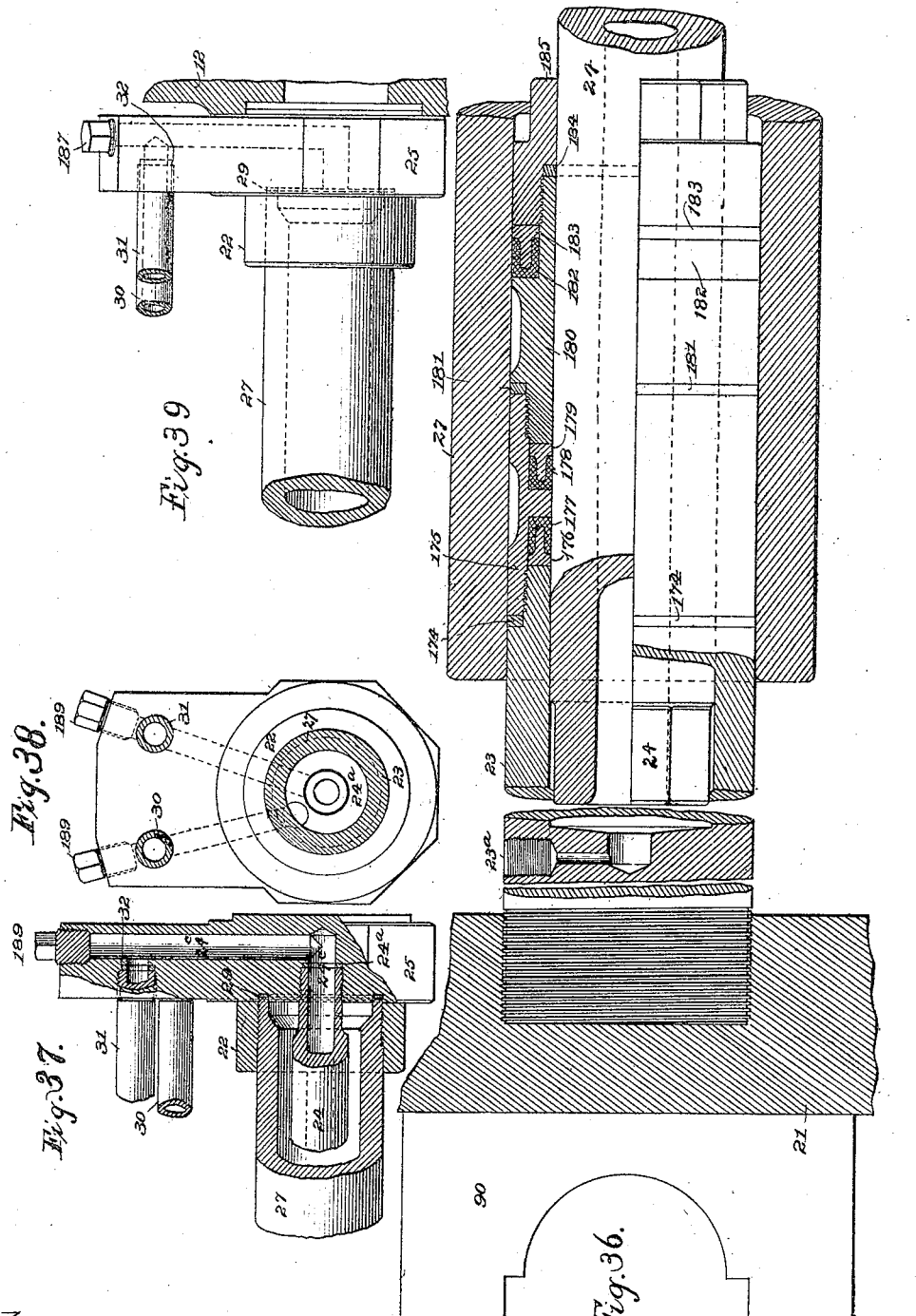

No. 786,963. PATENTED APR. 11, 1905.
A. H. EMERY.
MOUNTING AND OPERATING GUNS.
APPLICATION FILED APR. 13, 1893. RENEWED NOV. 22, 1893.
21 SHEETS—SHEET 16.
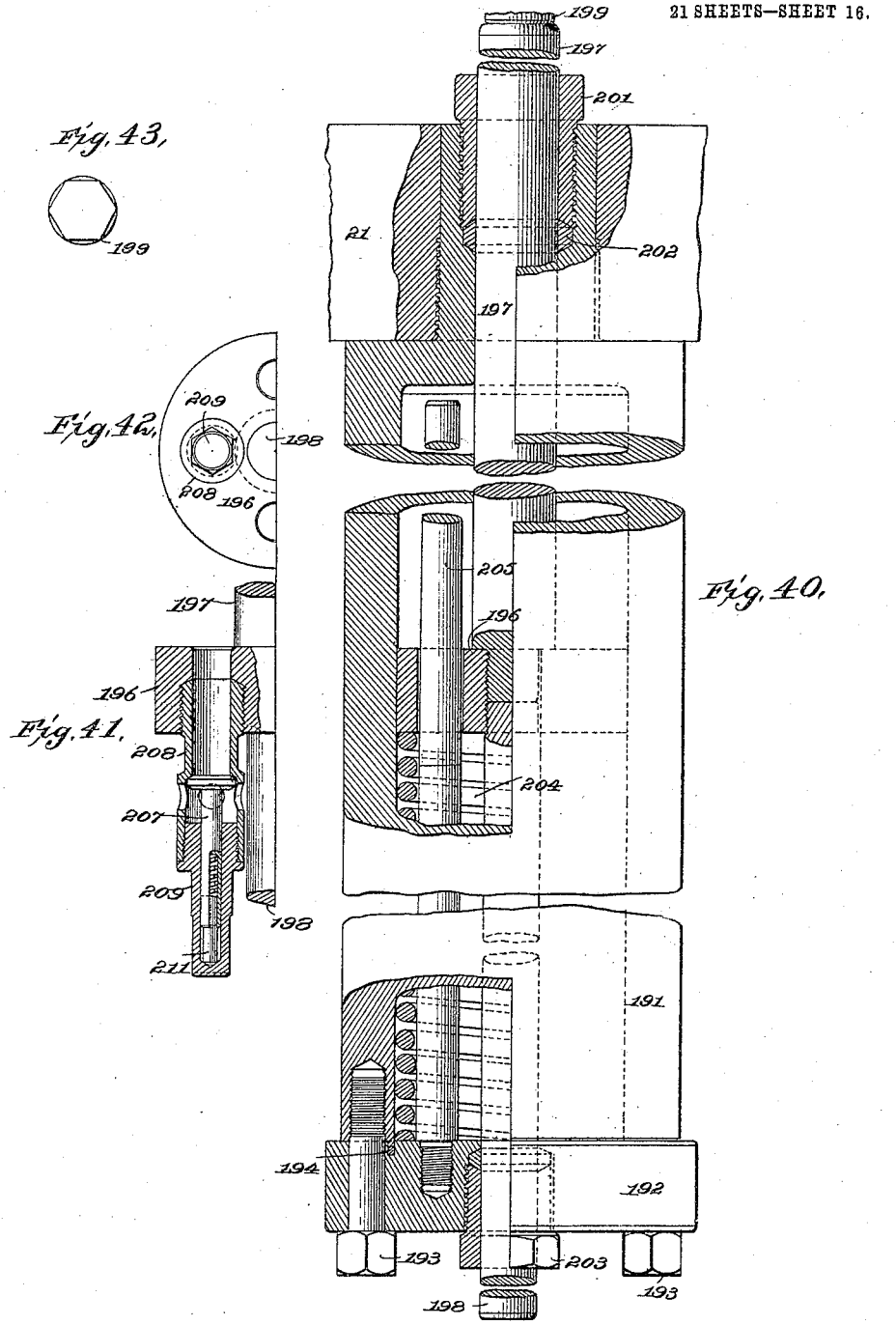

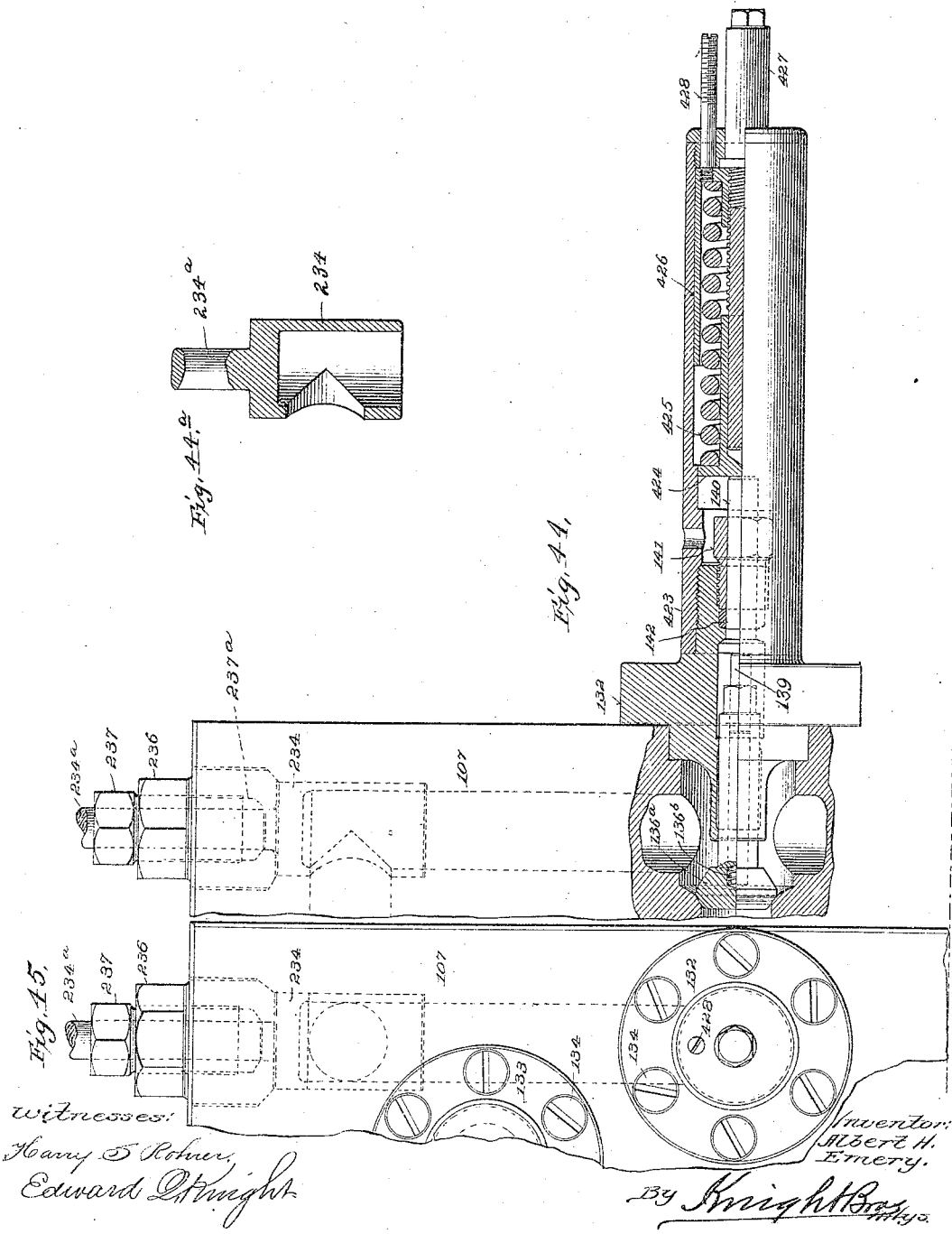

No. 786,963. PATENTED APR. 11, 1905.
A. H. EMERY.
MOUNTING AND OPERATING GUNS:
APPLICATION FILED APR. 13, 1893. RENEWED NOV. 22, 1893.
21 SHEETS—SHEET 18.
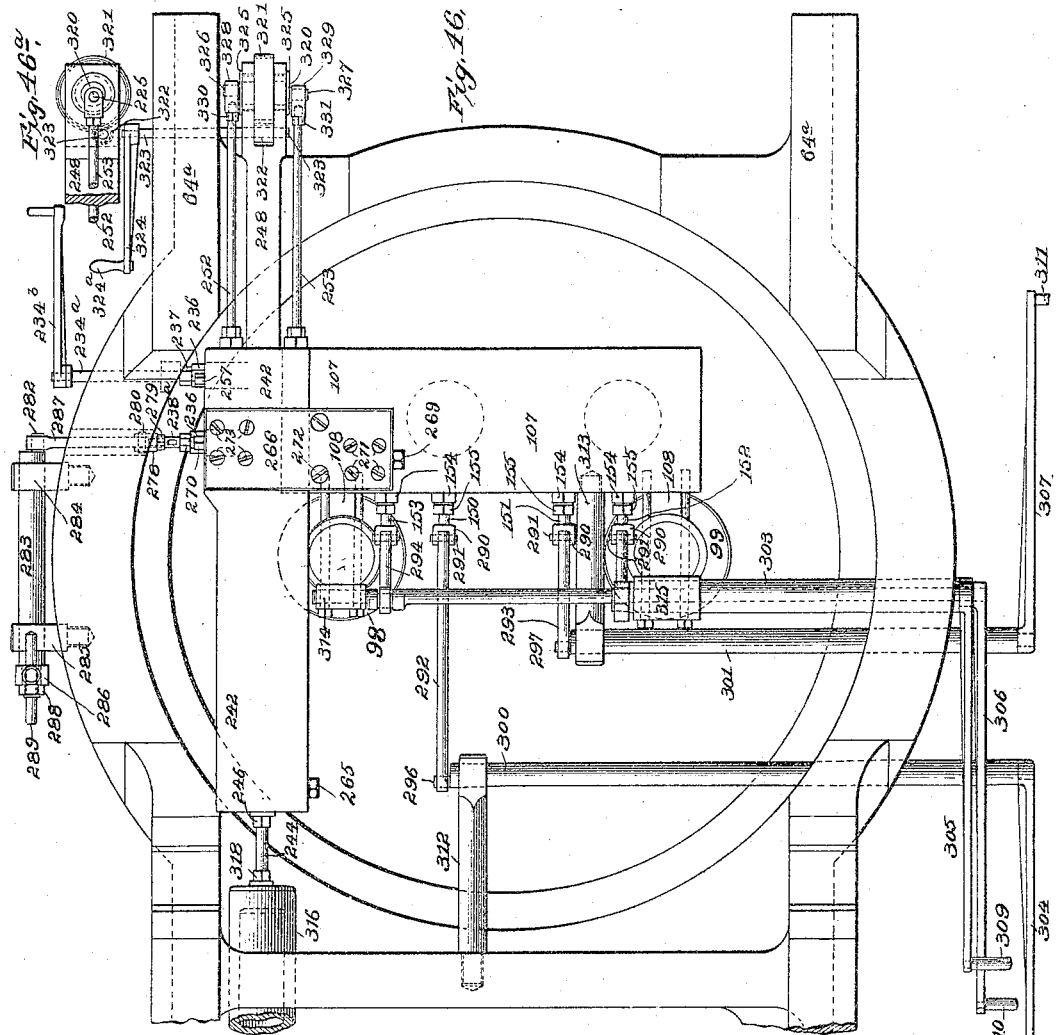
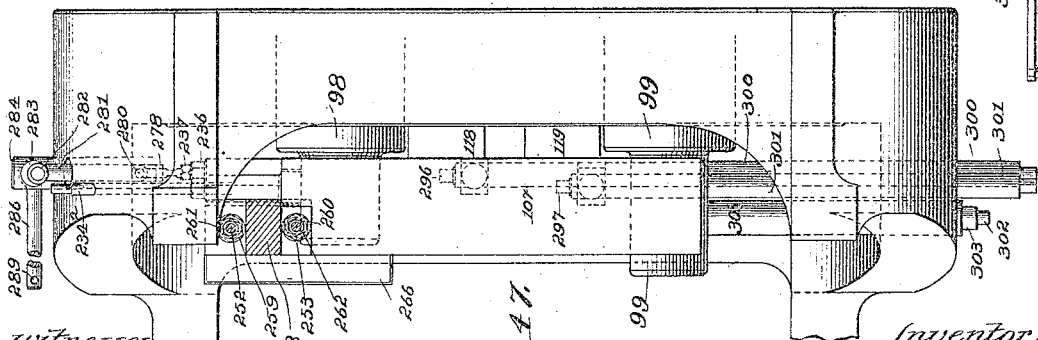
Witnesses
Harry S. Rohner
Edward D. Knight
Inventor:
Albert H. Emery,
By Knight Bros
Attys.

No. 786,963. PATENTED APR. 11, 1905.
A. H. EMERY.
MOUNTING AND OPERATING GUNS.
APPLICATION FILED APR. 13, 1893. RENEWED NOV. 22, 1893.
21 SHEETS—SHEET 19.
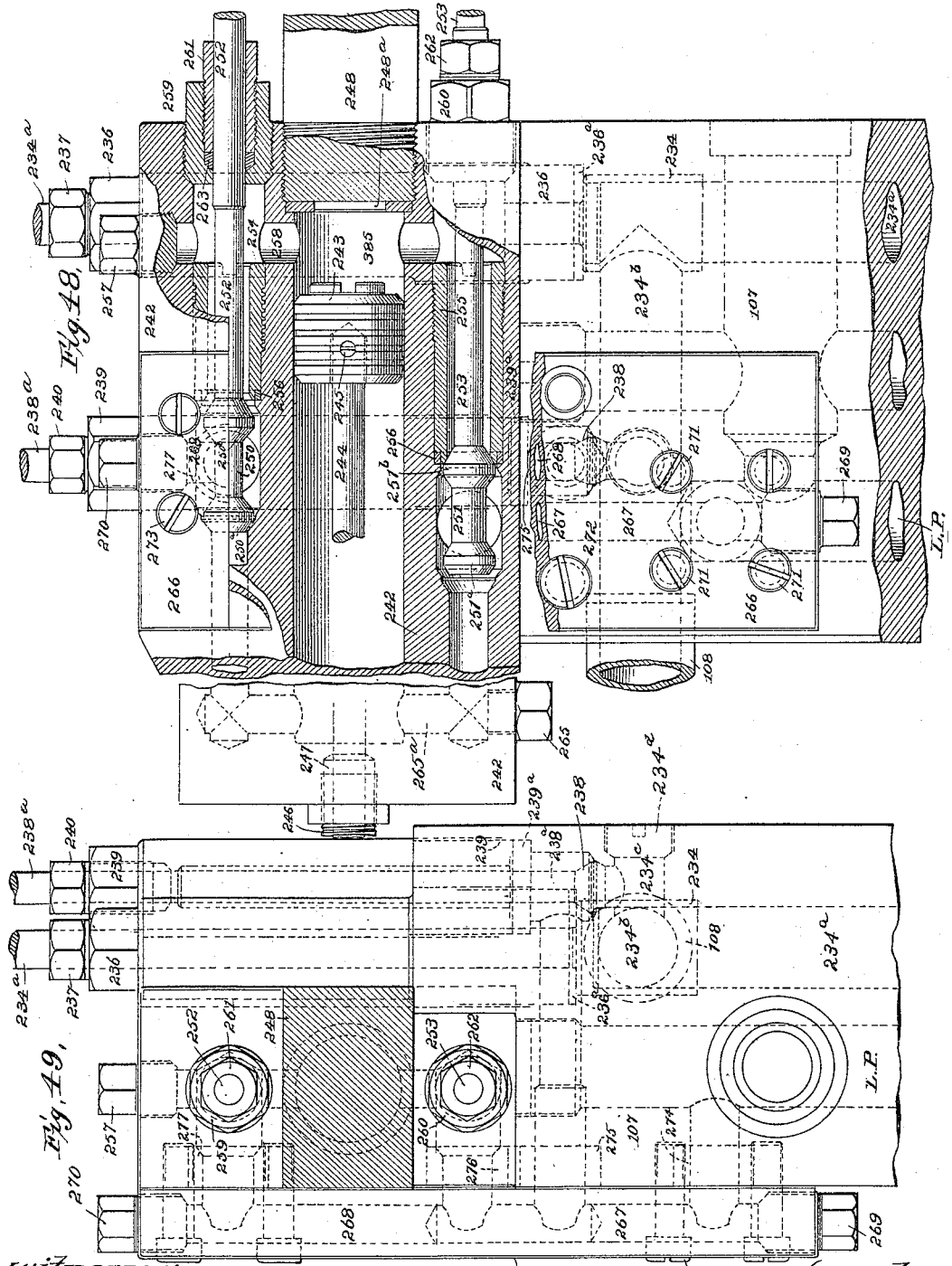
Witnesses:
Harry S. Rohn
Edward L. Knight
Inventor
Albert H. Emery.
By Knight Bros
Attys.

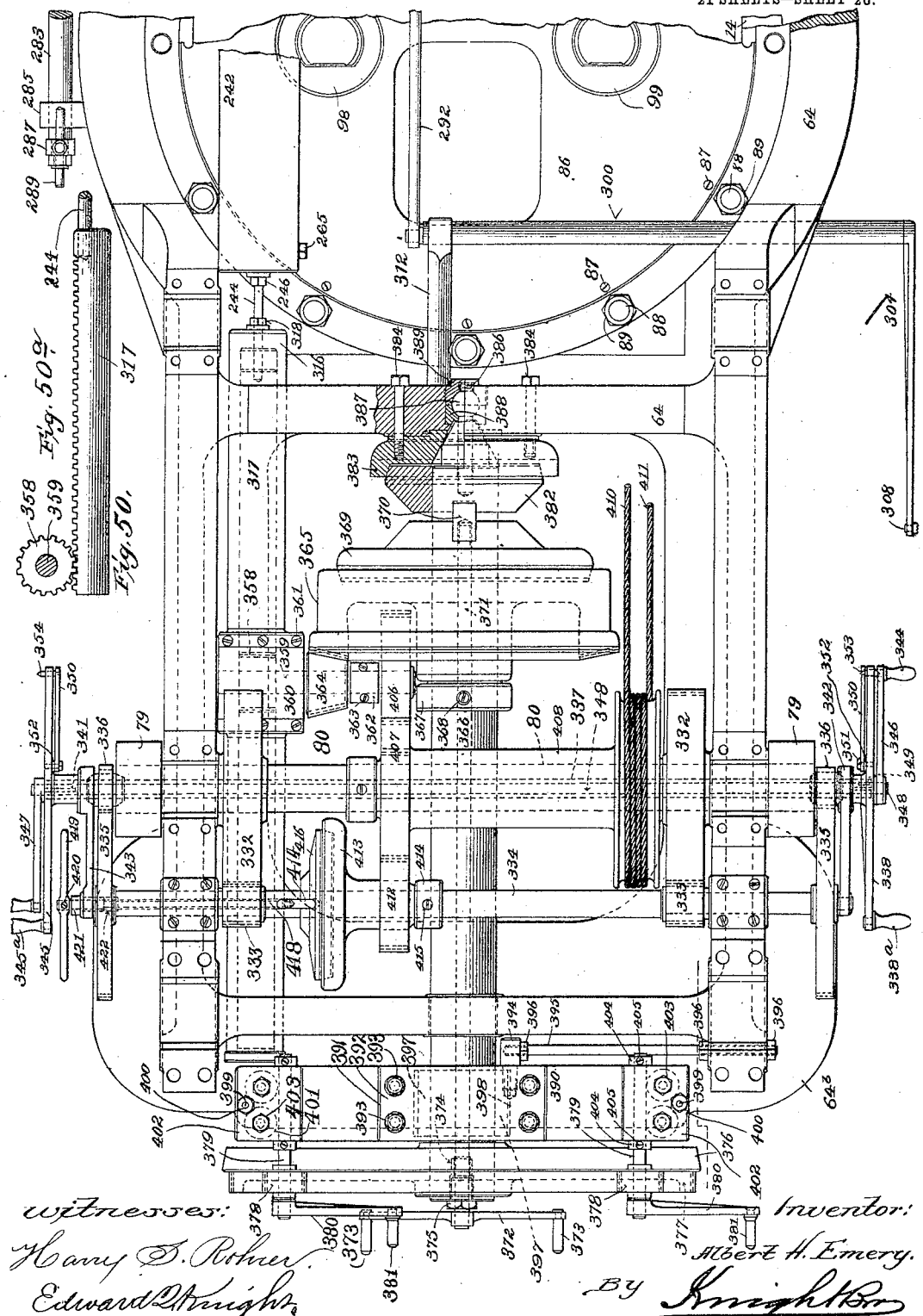

No. 786,963. PATENTED APR. 11, 1905.
A. H. EMERY.
MOUNTING AND OPERATING GUNS.
APPLICATION FILED APR. 13, 1893. RENEWED NOV. 22, 1893.
21 SHEETS—SHEET 21.
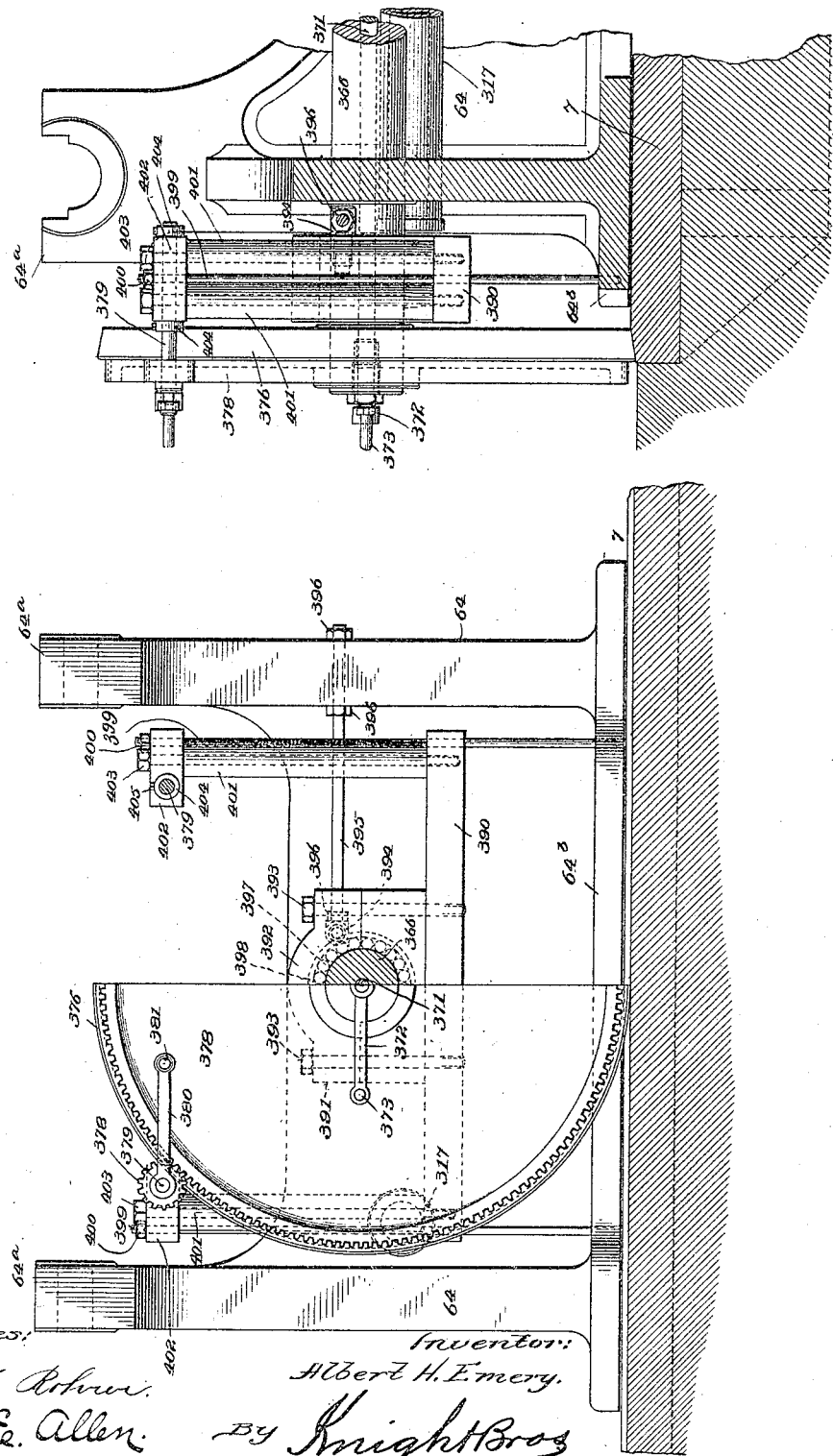

No. 786,963. Patented April 11, 1905.

UNITED STATES PATENT OFFICE.

ALBERT H. EMERY, OF STAMFORD, CONNECTICUT.

MOUNTING AND OPERATING GUNS.

SPECIFICATION forming part of Letters Patent No. 786,963, dated April 11, 1905.

Application filed April 13, 1893. Renewed November 22, 1893. Serial No. 491,686.

*To all whom it may concern:*

Be it known that I, ALBERT H. EMERY, a citizen of the United States, residing at Stamford, in the county of Fairfield and State of Connecticut, have invented certain new and useful Improvements in Mounting and Operating Guns, of which the following is a specification.

The nature of my invention relates to improvements in protecting-pits and the foundations necessary for use in mounting and operating heavy guns for coast defense and in recoil and elevating gun-carriages and in machinery and apparatus for use in and in connection with said carriages.

In the construction which I have shown to illustrate this invention all the details shown are necessary to the proper and best working of my invention and to the easy, quick, and safe working of the carriage and gun. Some of the improvements are useful in any kind of rotating carriages, whether they are elevating or non-recoil. Some of them are useful only in elevating carriages and some in that class only which have link connections for elevating the gun, while others are especially useful in recoil-carriages, whether elevating or simply rotating and elevating. Some of these improvements refer to methods of storing and using the power developed in the recoil of the gun to train the gun both horizontally and vertically and to assist in loading the gun and in improved details to carry out these purposes.

The carriage which I have taken to illustrate the use of my invention is one which raises the gun very much from loading to firing position and which requires strong heavy foundations and a deep protecting-pit around it, at the bottom of which it stands, to protect the gun and carriage from hostile shot or shell. This is an elevating carriage, with a link system to raise the gun, which is attached, through the links, to a main carriage-body which stands on a large long cylinder, to the top of which it is securely attached. The cylinder sits almost wholly in the foundation and is protected and sustained by a surrounding curb. This cylinder stands on a pivot, which supports it and the carriage and gun mounted thereon, permitting these parts to be revolved for horizontal training throughout the whole circle of three hundred and sixty degrees, the gun and carriage being mounted nearly centrally on this cylinder and surrounded by the pit-wall, which just clears the breech of the gun as it rotates. The muzzle of the gun when in loading position is some feet interior to this wall, which permits the upper portion of the pit-wall or the inner diameter of this upper portion of the pit to be materially reduced over the lower portion of the surrounding wall, allowing the whole pit to be more easily covered and protected than if it had the larger diameter. The gun, its elevating-links, and elevating-rods are so positioned and arranged that when the gun rises from loading to firing position the muzzle rises first and more rapidly than the breech, allowing the gun to be carried up through the pit-opening, which is smaller in diameter than the length of the gun, so that the gun may be trained for both horizontal and vertical training, and then raised to firing position, when after firing it descends immediately to the proper elevation for loading and is then trained horizontally to the loading-gallery, if such is used in one place only.

In the construction shown the gun stands in the saddle, which rests on a pair of coupled links, through which it is raised and lowered from loading to firing position and return. This gun is preferably mounted as shown in the drawings, with a protecting-pit with an opening through which the gun passes, the main diameter of which is less than the length of the gun, and in order that the gun may rise through this opening the elevating-links are or the link system is so constructed and arranged in connection with the elevating-rods 78 that when the gun rises the muzzle of the gun rises much more rapidly than the breech. The arrangement shown in the drawings is with such position and dimensions of elevating-links and such position and length of the elevating-rods that when the gun rises the muzzle rises in an almost vertical line for several feet, and when the gun starts to move up the breech of the gun actually moves downward a few inches at first, moving gradually to the left and afterward rising as the gun moves toward its firing position. To accomplish this, the centers of the elevating-links and the elevating-rods are placed in the carriage as shown, while the right-hand end of the elevating-rods are trunnioned to the gun in the rear of the trunnions, and when the gun is in loading position the following relations occur.

The plane through the axis of the trunnions of the gun and through their virtual fixed center of rotation due to the link system and the plane through the center of elevating-rods normal to a vertical plane through the axis of the gun intersect in a line between two planes normal to the axis of the gun, which pass through its trunnions and breech-face, respectively. When so arranged and the gun starts to move up, the muzzle moves almost vertically for some feet, while the extreme breech of the gun rises but little, if any, at first. With the links and elevating-rod arranged as shown the extreme breech of the gun actually moves downward at first while the trunnions of the gun are moving upward in the curved dotted line shown, and the muzzle moves up, as shown, in the lines which indicate the different degrees of elevation as it goes toward firing position. Care will have to be used in fixing the lengths and centers of the elevating-links and in fixing the lengths and centers of the elevating-rods, so that the gun will have the proper angle of elevation when the links reach their extreme limit of motion in rising to take the gun to firing position. If this condition is not observed, the gun will not have the proper angle of elevation when the trunnions are raised to the position they have at time of firing.

The mechanism for elevating the gun I have placed almost wholly in the main cylinder on which the carriage stands, with the exception of the carriage-body and link system referred to. This puts these working parts well out of the reach of hostile shots and makes their use much safer. In the rotating cylinder, on which the carriage stands, I have placed several series of long coiled spiral springs, usually several springs in a set, each interior one being wound in an opposite direction from its mate, and which are kept in axial position by guide-rods suitably fixed in the cylinder with their diameters parallel to the axis thereof. To avoid making these springs of great length and to better control their action in use, I have divided them into two or more parts, usually three, interposing between these parts pistons which fit in the cylinder and move up and down as the springs are extended or compressed in the raising or lowering of the gun. The gun stands or rests mainly on these springs through the interposition of the link system already mentioned, and the springs are so arranged and adjusted that at all points in raising and lowering the gun it is substantially nearly balanced by the load on the springs. To control the movement of the gun and cause it to move downward by its own weight, I make the resistance of these springs at the various points of position which the gun has in descending somewhat less than the weight of the gun and other parts carried on them, so that if other support is withdrawn the gun will descend from firing to loading position without firing. I add to this system to control the motions of the gun in raising and lowering a compound hydraulic press with two concentric cylinders sitting in the axis of the spring-cylinder to force the spring-cylinder piston to raise the link system, and to resist its downward motion after raising and firing the gun I connect to this press high and low pressure reservoirs, which are also preferably set in the spring-cylinder, one of which receives the liquid forced from the press during and by the recoil of the gun and which is supplied with air under heavy pressure contained in the reservoir over the liquid, which resists the flow of the liquid into it during the recoil and expels the liquid from it into either or both of the cylinders in the compound press to raise the gun from loading to firing position. When the air-pressure in the reservoir is sufficient, only the smaller cylinder of the compound press is used to raise the gun, and at this time the other cylinder is charged with liquid from the low-pressure reservoir, so as to be full of liquid and have no backlash when the gun recoils, which when full charges are used by the action of recoil expels the liquid from both cylinders of the compound press into the high-pressure reservoir until the motion of the gun has nearly ceased, when suitable valves are tripped and the balance of the liquid in the presses will be forced by the descent of the gun into the low-pressure cylinder, allowing the gun to descend to loading position. When small charges only are used, the valve which connects one of the compound-press cylinders to the low-pressure reservoir is opened, allowing the liquid from that press-cylinder to be forced into the low-pressure reservoir with little force, the main force of the recoil being expended to expel the liquid from the other cylinder of the compound press into the high-pressure reservoir to the extent necessary to use up the force of the recoil. Then the valve from that cylinder connecting with the low-pressure reservoir is opened and the gun descends to loading position. When one cylinder only is thus used to resist the recoil of the gun, it descends more quickly to loading position than when both are used to check the recoil and afterward discharge the balance of the liquid in them into the low-pressure reservoir. To easily control the passage of the liquid between the compound press and the reservoirs, I put upon the upper head of the spring-cylinder a valve-block containing all the valves necessary to control the flow of the liquid. This block is connected by pipes with the reservoir-heads, with which it stands on a level, and by pipes passing therefrom through the center of these reservoirs down through the air and liquid nearly to the bottom of these reservoirs, so that the liquid is expelled from either of them through its internal pipe by the air-pressure almost wholly before any air can get out, and I supply such quantity of liquid for these reservoirs and the compound press with such quantity and density of air in each reservoir over the liquid that in no case can the air in one cylinder expel all the liquid into the other cylinder and press; otherwise air from the high-pressure reservoir might by an improper use of the valves be discharged into the low-pressure reservoir. Pipes connect the valve-block on the top of the spring-cylinder with the bottom of the cylinders of the compound press. They stand parallel with the reservoirs and press and do not interfere with the motion of the spring-pistons.

To traverse the carriage horizontally, I provide a main traverse-wheel, which rests directly on the metallic bed which covers the masonry around the carriage and which is connected elastically with the carriage to permit of the vertical elastic movement of the carriage caused by changing the position of the gun from loading to firing position and the vertical component of the force of recoil in firing the gun. This system is arranged to operate the traversing of the gun by one or two men. I have also arranged a hand-power system, complete in itself, to drive by the power of one or two men the mechanism which controls the vertical training of the gun. For the purpose of operating either of these controlling mechanisms very quickly and easily I have provided a hydraulic press, located, preferably, on the carriage and suitably connected by gearing and clutches to these two hand-power training systems, one of which is also connected by a drum to a moving cable, by which I can transmit power to the loading apparatus. I have provided also a suitable brake to quickly check the great momentum of the gun and its carriage when moving rapidly for horizontal training. This press also enables the operator to train the carriage very slowly and with great regularity of movement for sighting a moving object. I have preferably arranged this press for horizontal and vertical training to be operated by the power stored in the high-pressure reservoir from the recoil of the gun, and I thus avoid all need of extraneous power from boilers, engines, or electrical sources, the recoil of the gun giving us all the power necessary to operate the mechanism for training the carriage and gun and loading it.

My invention is illustrated by twenty-one sheets of drawings showing the construction and the details thereof.

Figure 1 shows a side elevation of the gun mounted in loading position in the protecting-pit with the foundation in elevation and the walls of the pit in section. In this figure the gun and its elevating links and rods are shown also in firing position in dotted lines. This drawing shows also in full lines the curve of motion which the bottom of the muzzle describes when passing from loading toward firing position with the elevating apparatus set at the angles marked on said curves. Fig. 2 shows a plan of the gun mounted on an elevating-carriage in a protecting-pit with the cover of the pit removed. Fig. 3 shows a side elevation of a portion of the gun mounted on the carriage with the foundations only of the pit in section. Fig. 3$^a$ shows guiding-rollers in elevation. Fig. 4 shows the foundations of the pit in section with the gun and its carriage removed. Figs. 5 and 6 show a plan and elevation, respectively, (the latter partly in section,) of the main foundation-plate which covers the masonry of the foundation around the carriage. Figs. 7, 8, and 9, show, respectively, a plan, side elevation, and end elevation of the saddle for the gun. Figs. 10 and 11 show, respectively, a plan and elevation of the breech-ring which surrounds the gun and connects the gun with the carriage through the elevating-rods 78, one of which is shown attached to the ring in Fig. 11. Figs. 12, 13, and 14 show, respectively, plan, side, and end elevations of an elevating-link. Figs. 15, 16, and 17 show, respectively, a plan, with side and end elevations, of the rear elevating-link for the carriage, Figs. 15 and 16 showing, respectively, a plan and elevation of the beam which connects the front and rear elevating-links of the carriage. Figs. 18, 19, and 20 show, respectively, a plan, side, and end elevations of the carriage-body of an elevating-carriage. Fig. 21 shows in elevation a transverse section of the carriage-body on the line 21 21, Fig. 22, which shows the plan of the carriage-body and shows also the head of the spring-cylinder and the heads of the high and low pressure reservoirs and the valve-block with the pipes connecting the reservoirs with it. Fig. 21 also shows in section the spring-cylinder and its lower head, with the supporting-pivot on which the whole carriage rests, and the carriage-body in section resting on the spring-cylinder. This figure also shows the high and low pressure reservoirs, partly in section and partly in elevation, in position in the spring-cylinder, together with the valve-block in elevation, and a hydraulic press in elevation mounted in the spring-cylinder, together with a portion of the pipes which connect the press with the valve-block. This figure shows also in elevation two of the guide-rods for the balancing-springs, with their adjusting sleeves and screws for stopping off the springs. This figure shows also, partly in elevation, the upper piston of the spring-cylinder, the lower piston in elevation, on which the springs stand when in use, with two intervening pistons in section, which are used to divide the springs into superimposed groups, together with some other minor details, as pointed out in the specification hereinafter. Fig. 23 shows a side elevation of a portion of one of the guide-rods with its stopping-shoulder and a portion of the stopping-piston and a portion of a series of spiral springs which surround it. Fig. 24 shows a side elevation, partly in section, of a high-pressure reservoir and its attachments. Fig. 25 shows a plan of the same, partly in section. Fig. 26 shows a section on line 26, Fig. 22, of the carriage-body, the spring-cylinder with its upper and lower head and its pistons partly in section, and several of the spring guide-rods, one of the reservoirs, and the stopping-buffer in elevation, with the controlling-press in position in elevation, the latter being shown partly in section. Some other details are shown in this figure and mentioned in the specification. Fig. 27 shows in elevation a portion of one of the guide-rods and, partly in section, one of the stopping-sleeves and its adjusting-nut for use on this guide-rod to stop off from action some of the balancing-springs. This figure shows also a portion of a series of balancing-springs which surround this rod. Fig. 28 shows in plan a portion of the head of the spring-cylinder, a head of one of the pressure-reservoirs, and a portion of the other, together with a portion of the valve-block and the pipe connecting it to the reservoir. This figure shows also in plan a portion of the piston-rod which connects the spring-cylinder with the elevating-links, together with the plan of the ball-and-socket joint through which it slides. Fig. 29 shows a portion of the upper head of the spring-cylinder in elevation, together with a portion of the piston and a portion of the connecting-rod, with the attachments which connect it to the piston, together with the ball-joint around the piston and the parts which compose the socket for this ball-joint to slide in from right to left as the piston of the spring-cylinder moves up and down. Some other parts are shown in connection with the spring-head and piston which will be mentioned in the detailed specification. Fig. 30 shows a plan of the spring-cylinder and most of its contents in section, as will be described in detail in the specification. Fig. 31 shows a plan of the valve-block and its connections, together with the upper heads of the high and low pressure reservoirs and the pipes connecting them. Figs. 32 and 33 show, respectively, side and end elevations of the same parts shown in Fig. 31. Figs. 34 and 35 show, respectively, a plan and elevation of a portion of the valve-block and its connections, a portion of the plan being in section. Fig. 36 shows in side elevation part of one of the boxes which connects the link piston-rod to the spring-piston, with a portion of the compound press and its pistons in section. Fig. 37 shows the lower portion, partly in section and partly in elevation, of the compound press, the pipes which connect the press to the valve-block, and the block which connects the lower end of the compound press to these pipes. Fig. 38 shows a plan of the same, and Fig. 39 shows a side elevation of the same and a portion of the lower head of the spring-cylinder on which it stands, this part being in section. Fig. 40 shows, partly in elevation and partly in section, a hydraulic buffer used to check the upward motion of the parts moving to raise the gun to firing position, together with a portion of the piston of the spring-cylinder to which they are attached. Fig. 41 shows a by-pass valve in section attached to the piston of the buffer. Fig. 42 shows a plan of the same. Fig. 43 shows a plan of the adjusting-rod which operates in conjunction with the piston-rod of the buffer. Fig. 44 shows a plan, and Fig. 45 an elevation, of a portion of the valve-block and its attachments, showing a regulating-valve and showing one of the inlet-valves with the spring regulating apparatus to regulate the resistance of the flow of the liquid to the high-pressure reservoir during recoil, this valve and its attachments being shown in Fig. 44 partly in elevation and partly in section. Fig. 44$^a$ is a vertical section of a valve shown in Figs. 44 and 45. Fig. 46 shows a plan of a portion of the carriage-body with the upper heads of the high and low pressure reservoirs, the valve-block which connects them, and the compound press, together with the mechanism for tripping the valves in the valve-blocks. This figure shows also a supplementary press and its attachments for use in rotating by power the carriage, together with some of the parts for controlling the valve motion of the same. Fig. 46$^a$ shows a side elevation of a portion of the valve-controlling mechanism which is shown in plan in Fig. 46. Fig. 47 shows an end elevation of a portion of the carriage, the upper heads of the high and low pressure reservoirs, the valve-block connecting them, and a portion of the mechanism for controlling the valve motion, with some parts of the supplementary press used for rotating the carriage, &c. Fig. 48 shows a plan, partly in section, of the rotating press connected with one end of the valve-block, which is also shown. Fig. 49 shows a front elevation of part of the valve-block and an end elevation of the supplementary press, with an elevation of the pipe-block which connects the valve-block and this press. Fig. 50 shows a plan of the front end of the carriage-body of an elevating carriage with the elevating-links removed. This figure shows also a portion of the spring cylinder-head, the upper heads of the high and low pressure reservoirs, a portion of the supplementary press used for horizontal and vertical training of the gun, and shows complete the gearing, wheels, &c., used for hand and power training of the gun, both horizontally and vertically, and the power mechanism by which power is communicated to the loading apparatus. Fig. 50ª shows the rack and pinion of the supplementary press. Figs. 51 and 52 show, respectively, end and side elevations of the traversing wheel and the method of connecting it to the carriage.

In Fig. 1, A represents the main body of the foundation on and in which the carriage rests. B represents a suitable wall carried up around the gun and carriage, making a circular opening of sufficient diameter to traverse the gun horizontally throughout the whole circuit required, which in many cases is three hundred and sixty degrees. C represents a portion of the concrete surrounding this wall and covering it to a height sufficient to give a loading and protecting pit of the desired depth. D represents stairs leading from the pit or loading-chamber down to the magazine where the projectiles and powder are kept. The foundation A may be made of concrete or other suitable masonry. B may be replaced by concrete and metal or it may be made of stone and lined with metal, if desired. The concrete C may be partially replaced by stone or other masonry, if desired. E represents a horizontal plate passing throughout a portion or the whole of the circuit to cover the wall B and protect it and help to retain in place the vertical protecting plate or plates F. G G are coned or horizontal protecting-plates covering the concrete or masonry next to the vertical lining-plates F, to which they are secured by the angle-irons I. These plates are secured to the masonry or concrete by the eye-beams H H. The vertical protecting-plates F are secured to the horizontal plates E by the angle-bars J J, the plates E being secured in the masonry by the angle-irons K. All of these plates and angle-irons are best made of steel. G and F may well be hardened to some extent. L shows a covering-plate nearly cut in two with a longitudinal slot, through which the gun rises from loading to firing position. This plate is removed in Fig. 2. It may be supported by a carriage carried on the foundations A or by struts supported by the carriage-body 64 and must revolve with it. It should be provided with a covering door or doors which close the slit automatically as the gun descends and which are opened automatically as the gun rises to firing position.

A good division for the protecting-plates G is shown in Fig. 2, these plates in Figs. 1 and 2 being shown as a protecting-cone extending out over the masonry several feet. The detailed construction of the foundation under and around the gun-carriage is shown in Figs. 3 and 4 in sectional elevation. where M shows a large bed of concrete extending under the whole carriage and out under the walls B of the protecting-pit. This concrete M rests on 7 and extends down into the natural bed N of the soil on and in which the foundations are placed. The carriage proper sets on and in the foundation and as here shown rests mainly on the bed 1, which is secured by bolts 7 6 to a ring 2, the latter being riveted to the curb-plates 3 3. The curb-plates are riveted directly together or to joining-plates 4 when they do not overlap each other. The upper one is secured to the foundation-plate 8 by the ring 8ª and the bolts 8ᵇ. (Shown in Figs. 3 and 4.) Curb-plates 3 are secured together and to the rings 2 and 8ª by rivets 5. (Shown in Fig. 4.) The foundation-plate 8 is enlarged and extended by the plate or plates 7, which are fitted to its outer circumference and which had best overlap it, as shown in Figs. 3 to 6, inclusive. It is secured to the foundation by bolts 162 and 147, (shown in Fig. 3,) and when it overlaps the plate 8 it is secured to it and the foundations by screw-bolts 11. (Shown in Figs. 3 to 6, inclusive.) The bolts 162 and 147 are properly anchored to metal at their bottom end and are secured at the upper end by countersunk nuts 165. When the foundations M are erected on or in dry rock bottom or dry hard supporting-soil, the metal curb, made of the parts 1 2 3, &c., which separates the spring-cylinder 14 from the concrete around it, may be used without the outer protecting-curb. When much water is around the pit or this curb is sunk in wet sands or in quicksands, an outer curb, consisting of parts 158 159 160 161, (shown in Figs. 3 and 4,) is needed. This pit is sunk in the foundation to its proper depth and should, if practicable, be well set in concrete or other masonry and have the space between it and the inner curb well filled by strong fine concrete or closely-laid masonry and should be water-tight if this concrete or masonry is exposed on its exterior to water. All the concrete around the inner curb should be good and strong and closely rammed, as should also the adjoining concrete under the bed 8 and its extension 7. These foundation-plates should be set very carefully in good concrete, level, and with their axial center directly over the center of the bearing-plate 1. It should be made of gun-iron or a steel casting. The balance of the inner curb, including its upper ring 8ª and the foundation-plate 8, had best be made of steel. The whole inner curb should be water-tight and secured to the bed-plate 1 sufficiently to give all the required support to the carriage that is necessary in firing, even should the concrete between it and the outer curb be cracked in firing the gun or from other causes. This curb not only serves to connect the bed 1 with the foundation-plate 8 and support it, but helps to protect the spring-cylinder 14 from water or from the concrete M being forced against it by shell or shot which penetrate the foundation. When the outer curb 160 161 is used, the foundation-bolts 162 had best reach down and be fixed to it, as shown, thus serving to support the outer curb and rigidly connect it to the foundation-plate 7, which may be made of steel castings or gun-iron of sufficient strength and stiffness to support the carriage-body 64, which may rest upon it at time of firing and which will usually do so when firing at any considerable angle of elevation. The extending bed 7 may be made in one piece; but owing to the difficulty of shipping I prefer to divide it into two or more pieces. In Figs. 5 and 6 this bed is shown in two pieces secured together by bolts 9 and nuts 10. (Shown only in Fig. 5.)

The carriage which I have shown in detail is an elevating-carriage, which needs the protecting-pit and firm foundations shown. The carriage-body proper, 64, is shown in detail in Figs. 18 to 20, inclusive, and had best be made of gun-iron or preferably a steel casting securely mounted on a cylinder 14, as shown in Figs. 21 and 26, to the top of which it is secured by bolts and nuts 88 and 89. (Shown in Fig. 26 in elevation and Fig. 50 in plan.) The cylinder 14 is best made of gun iron or steel and provided with a lower steel head 12 (shown in Figs. 21 and 26 in section) and bolted to the cylinder by bolts 13. (Shown in Fig. 26 only.) The joint between this head and the cylinder should be made oil-tight by a suitable packing-ring $12^b$. (Shown in Fig. 21.) 15 is a steel supporting-stud (shown in Figs. 3, 21, and 26) on which the carriage rests and turns as it is rotated. The lower end of this is polished to reduce friction and sets in a shoe 16, (best made of bronze,) which contains antifriction-plate 17, on which the pin or stud 15 rests. These plates are made of any suitable material. I prefer to make them alternately of hard bronze and thin hard-tempered steel plates, with a suitable unguent between these plates. This unguent may well be made in a pasty form—of rosin, beeswax, tallow, and plumbago—the latter constituting fifteen or twenty per cent. of the mixture. The cylinder 14 is closed at the upper end by the covering-plate 86, which is shown in Figs. 22, 26, 50, and some others. It is secured to the carriage-body 64 by screws 87. (Shown in Fig. 50.) The cylinder 14 contains most of the elevating apparatus, which will be explained later. The carriage-body 64 has mounted on it two elevating-links 51 and 52, which carry the saddle 68 in which the gun 71 is mounted by its trunnions 72, which are secured to the saddle 68 by the caps 69 and the screws 70. (Shown in Fig. 3.) The links 51 and 52 are connected to the carriage-body by the pins 55 and 53, respectively, and to the saddle, respectively, by pins 56 and 54. The pins 55 and 53 at the bottom of these links may, if desired, be replaced by a single pin running clear through the carriage. 56 and 54 at the top of these links may, if the carriage is designed with reference thereto, be replaced with single pins running clear through, but with the saddle 68 proportioned as shown they must be used one at either side to be out of the way of the gun when moved to different angles of elevation. The link 51 has an arm or projection $51^c$ on the bar $51^b$. (Shown best in Figs. 12, 13, and 14.) The two side members of this link 51 are connected by bars or beams $51^a$, which support the beam $51^b$ and the cap 61 at the bottom thereof. Link 52, like 51, also consists of two main side members, which here are of the I-beam form, joined together by bars $52^a$, supporting-beams $52^b$, with lugs 58, projecting from the lower side of these beams. The lug $51^c$ on the beam $51^b$ and the lugs 58 of the link 52 on the beams $52^b$ are connected by the horizontal load-bearing beam 48, (shown in Figs. 15 and 16,) which is connected to the link 51 by the pin 50 and to the link 52 by the pin 57, as shown in Fig. 3. The gun is raised from loading to firing position through the medium of these links and its saddle by the piston-rod 47, which is connected by the pin 49 to the load-beam 48 and by pin 46 and box 44 to the piston 21, which moves up and down in the cylinder 14 under the action of springs or hydraulic presses or other suitable means, as hereinafter described. The connection of this piston-rod 47 to its moving piston 21 is clearly shown in Figs. 26 and 29. Instead of being connected to the load-beam 48 and through it to the links 51 52 it might be connected directly to either of the links 51 or 52 and the load-beam 48 be dispensed with; but I prefer the construction shown in this case. In lighter carriages for smaller guns a good construction is to connect this piston-rod 47 directly with the pin 50, seated in the link 51, dispensing with the pins 56 and 54, link 52, and load-beam 48, and the saddle 68, the trunnions of the gun resting directly in the upper end of the link 51, which is suitably constructed therefor. This construction, however, does not hold the gun as steadily in firing as does the saddle 68, resting in a pair of links 51 and 52 of suitable construction, as shown. In firing the gun at low elevations but little longitudinal strain is put upon these links; but they are strained transversely under the action of the recoil of the gun which forces them back quickly, giving compression on the right-hand side of the links when in their vertical position, as shown in Fig. 1 by the dotted lines, and on the left-hand side of the links tension at the same time. When firing at a considerable elevation with large charges, there is a very heavy strain of compression longitudinally in the links. These longitudinal strains, added to the transverse strains of the link before referred to, act to increase the strain of compression on the right-hand side of the link, which is the lower side of the same when the gun is in loading position, and to change the tension in the opposite side of the link to compression. Were the link constructed symmetrically with reference to the plane through the pin centers, the right-hand or lower side would then be strained much greater than the upper side, for which reason the lateral braces of these links $51^a 52^d$, (shown in Figs. 12 to 17, inclusive,) are placed on the lower or right-hand side of these links, thus tending to equalize the maximum strains in the top and bottom or left and right hand sides of these links. In the arrangement shown the links in loading position are shown in Figs. 1, 2, and 3 as lying horizontally, and the links are shown in Fig. 1 by dotted lines in a nearly vertical position, having passed the vertical line and gone to the left thereof. They are made to work this way for the reason that if they were left vertical or inclined to the right when the gun was fired firing at angles of depression tends to lift the gun-carriage from the foundations. When the links are carried to the left beyond the vertical position, this tendency to lift the carriage by firing at angles of depression is compensated for by the position of the links, and the carriage is not raised. If they are carried sufficiently far beyond the vertical, the weight of the carriage alone will be sufficient to hold it down when firing at the greatest angles of depression, which in the carriage shown is five degrees. In raising the gun by the link system through the action of the piston-rod 47 consideration should be had as to how this rod is to be actuated before connecting it to the link system—that is, whether by a constant or decreasing source of power or pressure. In the rising of the piston 21, which is attached to the lower end of the rod 47, the motion of the gun and its elevating-links do not correspond uniformly to the motion of the piston, the rate being more or less changed by changing the position of the connecting-pin 50, which is shown in Figs. 3 and 13 to be very considerably out of the line or plane passed through the link-pins 55 and 56. This position facilitates very greatly balancing the gun through the action of the piston 21 on springs which have a decreasing lifting power as the gun rises or on a press which is driven directly or indirectly through the action of compressed air, which as it expands gives less pressure on the piston of the press or on the liquid forced by it into the press to lift the gun. The carriage-body 64, saddle 68, and links 51 and 52, with the load-beam 48, may be made of any suitable material, a good one for which is steel castings. Parts 64, 51, 52, and 68 should not only be of ductile steel, but able to stand a fair ballistic test without cracking. The link 51 may be made of two rolled bars properly constructed to connect with the link-pins 55 and 56 at their two ends and suitably connected to each other by cross-beams and braces; but I prefer to make them in one piece, as shown. The saddle 68, which is shown in detail in Figs. 7 to 9, inclusive, has two main sides or cheek-plates firmly secured together. In the drawings shown they are all in one piece, consisting of a steel casting suitably connected by cross-webs. The front and rear ends of the carriage are each connected to the supporting-links by a pair of bifurcated bearings, which seize firmly the connecting-pins 56 and 54. These pins bear in boxes constructed on the upper ends of the links 51 and 52. The bifurcation might have been on the ends of the links instead of on the saddle and the saddle changed correspondingly; but in any event the bifurcated bearing will be much better than the single bearing only. Similar joints connect both of these links 51 and 52 to the carriage-body 64, the bifurcation in this case being on the link instead of on the carriage-body.

In Figs. 1, 2, and 3 the gun is shown in loading position, with the link system supported by the piston-rod 47, also resting on elastic buffer-pieces $52^r$ between the two links 51 and 52, and $64^r$ between the link 52 and the arms of the carriage-body $64^a$, on the right-hand end thereof. These buffers $52^r$ and $64^r$ hold the gun at the exact height for loading. When firing, the elevation is controlled by elevating-rods 78. (Shown in Figs. 1, 2, and 3.) These rods are connected to the gun through the two-part ring 73 74, (shown in Figs. 1 and 2 and in detail in Figs. 10 and 11,) the two parts of the ring being secured together by bolts 75, as there shown, and the rods 78 secured to trunnions on the ring 73 74 by nuts 76 and washers 77. The lower ends of the rods 78 are shown in Figs. 1, 2, and 3 connected to the elevating-racks 65 by wrist-pins. (Not numbered.) The racks are held and guided in position by guiding-rests 66, to which they are dovetailed, and are operated by pinions 79, placed on the outer ends of the shaft 80, bearings for which are shown on the carriage-body 64 in Figs. 18 and 19, this shaft being driven by any suitable means, no provision being shown therefor in Figs. 1 and 2.

In Fig. 3 carriage-body 64 is shown as resting on a cylinder 14 and also as resting on the extending bed-plate 7. As a matter of fact, however, it rests wholly on the cylinder 14, except to the limited extent to which it is supported by the traversing wheel, which is not shown in Figs. 1, 2, and 3. There is a slight clearance or space between the carriage-body 64 and the foundation-plate 7, which changes when the gun passes from loading to firing position, owing to the springing of the body 64 and the cylinder 14 under the changing load of the link system, which when the gun is in loading position lifts on the pins 55 and 53, but which press downward heavily when the gun is in firing position and still more heavily when the gun is fired at any considerable angle of elevation. If this space between the carriage-body 64 and bed-plate 7 is large, the whole of this changing load will come upon the cylinder 14, supporting-pivot 15, and bed-plate 1 and may unduly strain not only the cylinder and bed-plate, but also the curb surrounding the cylinder and the carriage-body 64, to prevent which the space between the body 64 and bed-plate 7 is made slightly larger than necessary to permit clearage between these parts when traversing the gun horizontally in either loading or firing position. Then when heavy longitudinal strain is brought upon the links by firing the gun at a considerable angle of elevation the compression of the cylinder 14 and the extension of the curb 3 3, &c., together with the bending of the carriage-body 64 and the cylinder 14, will cause the shoe 64ᵇ of the body 64 to strike and rest heavily on the bed 7 until the shot is expelled from the gun and the pressure of the gases therein largely reduced. This not only saves the carriage, cylinder, and its curb from injury, but holds the carriage-body very firmly at a time when the action of the gases tends to disturb its position by unequal pressure on the different sides of the chamber. The center of gravity of the carriage and gun in loading position is at the right and in firing position at the left of the axis of the cylinder 14, which causes a strong tipping force to tip the cylinder against the guiding foundation-plate 8, which holds the top of the cylinder 14 in its vertical position. To prevent friction between the cylinder 14 and this foundation-plate 8 when traversing the gun horizontally, a series of hardened-steel bearing-rollers 84 are placed between them, as shown in Fig. 3, some of these cylinders being shown in detail in Fig. 3ª, which shows them with journals on either end resting in rings 85, which had best be made of bronze and which keep the rollers 84 parallel and equidistant. The piston 21 (shown in the cylinder 14 in Figs. 3, 21, and 26) may be operated by any suitable means to raise the gun. Should we depend upon a pneumatic system alone, the breakage of a pipe or reservoir or press-cylinder at an inopportune time might destroy the carriage. This danger is greatly reduced if a hydraulic press intervenes between the pneumatic system and the piston 21, with proper valves for throttling and controlling the flow of the liquid. The danger is still further removed and the quality and easy control of the carriage greatly enhanced by providing a series of springs, which for convenience are best placed in the cylinder 14, which I here term the "spring-cylinder," and which act on the piston 21 to cause it to balance in all positions very nearly the load on them produced by the weight of the gun and the link system, which are almost wholly actuated in raising the gun to firing position by these balancing-springs and which also consume in being compressed most of the work produced by lowering the gun and link system from the firing to loading position, these springs taking up the work in lowering the gun and giving it out again in raising the gun to firing position. A convenient way to overcome the friction of the moving parts while doing this is to so proportion and arrange the springs that while nearly balancing the gun in all positions they are not quite sufficient to lift it. A supplementary press placed at any convenient point, and which I prefer directly in the spring-cylinder, is used to raise the gun by the help of the springs from loading to firing position. By removing the pressure from this press the weight of the gun and moving parts of the link is able in the downward motion to overcome the friction, compress the springs, and expel the liquid or air from the press. I prefer for this press the hydraulic to the pneumatic, as it controls the system much better, and for this purpose I make use, preferably, of a compound press, consisting of two or more cylinders arranged to act either separately or in conjunction in raising or lowering the gun, and these cylinders, which are best made concentric with each other and placed in the center of the cylinder 14, so as to give no tipping strains on the piston 21. Its construction is shown in Figs. 36 to 39, inclusive, and its position is shown in use in Figs. 21, 26, and 30. 27 is the main cylinder, on the bottom of which is screwed a sleeve 22, which is secured to a base-plate 25 by bolts passing through it into 22. These bolts are not shown, but when tightened they force the cylinder 27 firmly onto the packing-ring 29, (shown in Fig. 37,) making a tight joint between the parts 27 and 25. 23 (shown in Figs. 21, 26, and 36) is the piston and piston-rod for this cylinder. It is screwed firmly into the piston 21, which works in the spring-cylinder 14. The piston or piston-rod 23 is also the cylinder for the concentric inner press, which has a hollow piston and piston-rod 24. (Shown in Figs. 36 and 37.) This rod is screwed firmly into the base-plate 25, a tight joint being made between it and the base-plate by the packing-ring 24ª. A passage 24ᵇ, Figs. 26 and 36, leads from the piston 24 through it into the cylinder, in which it acts in 23. A passage 24ᶜ, Fig. 37, also leads from this piston 24 through the base-block 25 to the stand-pipe 31, (shown in Figs. 37 and 38,) this stand-pipe leading to the valve-block which controls the flow of the liquid to or from the supplying or receiving reservoir which is connected with these presses.

Fig. 38 shows a passage leading from the cylinder 27 to the stand-pipe 30, which also leads to the valve-block where the control and flow of the liquid is directed to or from the reservoir to which it is taken or from which it is expelled. The position of these presses in the spring-cylinder is such that it is very difficult to get at them when the whole carriage is assembled and in use, and to avoid difficulty in getting at the packings they are all assembled and connected directly to the piston-rod 23, so that by raising the piston 21 and the connecting-rod 23 all these packings are removed with it and are conveniently altered or readjusted and replaced in working position. There are three of these flexible packings here shown in Fig. 36, Nos. 177, 178, and 182. They are forced to expanded position by the rings 176, 179, and 183. They are secured to the piston 23 by the screw-collars 175, 180, and 185, the latter being made tight with each other and the piston 23 through the medium of suitable packings 174, 181, and 184, which are best made of bronze or brass. The parts 23, 24, and 27, also 22, 25, and pipes 30 and 31, may advisedly all be made of steel, as may parts 175 and 180, which should be slightly smaller in diameter than the cylinder 27, in which they move. Screw-collar 185 may well be made of bronze and fit cylinders 27 and 24 closely, which should be very smooth on their bearing-surfaces to cause easy working and avoid cutting the packings which work against them. The packing 177 prevents the flow of liquid from the interior to the exterior of cylinder 23, while the packing 182 prevents the liquid flowing between the cylinder 27 and its piston 23, 178 preventing the liquid flowing from the interior of the cylinder 23 into the annular space between 24 and 27 when the pressure in the cylinder 23 is superior to that in 27, as is always the case when this cylinder alone is used in lifting the gun or in receiving the main force of the recoil, which is the case when the valve leading from the annular space around it is left open to the low-pressure reservoir. The power to operate this compound press may be derived from some extraneous source; but I prefer to make use of the work of the recoil of the gun, storing it up in one or more high-pressure cylinders in which a quantity of air is placed under heavy pressure by the use of an air condenser or compressor, allowing this air to resist the flow of the liquid which is forced by the recoil of the gun from the press into this high-pressure reservoir, from which it is again expelled by the pressure of the air over the liquid into the presses provided for working the gun and carriage. I provide two of these reservoirs, one for high and one for low pressure, which for convenience I have placed in the spring-cylinder 14. They are arranged symmetrically with the press and are shown in Fig. 21 in elevation, partly in section, and in Fig. 30 in plan in section. The construction of one of these reservoirs is shown in Fig. 24, where 40 represents the body with an upper head 98 screwed therein and made air-tight by a metal ring 100, best made of bronze or brass, which is placed between them and well calked or pressed in position sufficiently to make an airtight joint under heavy pressure. To prevent its moving outward with the end of the body 40 under the action of this pressure, it is lap-jointed, doweled, or undercut with the head 98 and is doweled with or overhangs the end of the cylinder 40, which aids in keeping this joint tight. The interior side should be wider than the exterior, so that it will always be held tightly in position. One of the heads of the cylinder should be movable for convenience, and I have shown the lower one thus arranged. It consists of a steel block 102, securely bolted to the ring 229, screwed into or onto the cylinder-body 40. To have this ring out of the way in this case, I have put it inside of the cylinder. The joint between the head 102 and body 40 is made tight by a ring of soft metal 102ª, which is pressed air and liquid tight by the holding-bolts 104, which pass through the head 102 into the ring 229. When the ring 229 is on the interior, as shown, the joint between the head of the bolt 104 and the cylinder-head 102 may be made tight by using one or two interposed bronze or brass rings 104ª 104ᵇ. In the head 98 of the cylinder 40 is screwed a pipe 42, made air-tight with the cylinder-head by the packing-ring 106. This pipe passes nearly to the bottom of the cylinder, which is always used in a vertical position, so that most of the oil or liquid stored therein will be forced out before any air can be removed. A valve-block 107 is arranged in connection with the high and low pressure reservoirs, as shown in Fig. 21 in elevation and Fig. 22 in plan, where it is connected directly to the two heads 98 and 99 of the high and low pressure reservoirs by the pipes 108, which are made tight in the heads and in the valve-block by packing-rings 109 at each end of these pipes, which receive sufficient pressure from the screw-bolts 110, (shown in Figs. 24 and 25,) which secure the reservoir-heads to the valve-block. Pipes 30 and 31, the upper and lower ends of which are shown in Fig. 21 and the lower ends in Figs. 37, 38, and 39, lead from the valve-block 107 to the outer and inner cylinders of the compound press. These pipes screw into collars 118 and 119 at their upper ends and are forced tightly against packings in the valve-block 107 by screw-bolts 120, as shown in Figs. 28 and 29. To make and keep the joints tight between the valve-block, these pipes and the press and its reservoirs, the latter should rest mainly on springs 233, which for convenience are placed in the bottom heads 102 103, as shown in Fig. 24, where they are retained in position by cap-nut 231, containing the shouldered stud 132, which is forced by the spring against the cylinder-head 12 to support the reservoirs in position in the spring-cylinder 14. For controlling properly the flow of the liquid between the high and low pressure reservoirs and the compound press the valve-block 107 is constructed as shown in Figs. 31, 32, and 33 and contains a pair of high-pressure valves 136 136ª and a pair of low-pressure valves 138 138ª. The two valves 136 and 138 communicate, respectively, with the high and low pressure reservoir and with the interior of the compound presses, the liquid passing from either of these reservoirs through the pipe 31 and through the piston 24 to its operating-cylinder, which is the piston 23, or it passes from this cylinder in the reverse direction to the low-pressure reservoir when valve 138 is open or to the high-pressure reservoir when valve 136 is open. Thus if the gun were recoiling and the valves were undisturbed by the trip-rods 150 152 (seen in Fig. 31) valve 138 would be automatically closed by its closing-spring and by the pressure of the liquid, while valve 136 would be forced open by the pressure of the liquid, which would then pass through it and into the high-pressure cylinder 40 as long as the gun continued to descend. When recoil ceases, if the gun is not clear down valve 138 will be tripped by the use of the trip-rod 152, when the gun would continue to descend and force the remainder of the liquid in the inner cylinder into the low-pressure cylinder 41. The detailed construction of a pair of these valves is shown in Figs. 34 and 35, which show the left-hand end of the valve-block 107 with the pipe 31 screwed into the collar 119, forced against its packing-ring 32 by the screw-bolts 120. A portion of the block 107 is broken away to show the high-pressure valve 136, which is precisely in construction like that of the low-pressure valve 138, which is not shown in these figures. The valve-chambers for these two valves 136 and 138 are closed by blocks 132 133, which are secured in position by the screws 134. The valve-stems are hollow, and the one 136 is broken open to show the closing-spring 136ᵇ, which is a small spiral spring contained in the stem, one end of which presses against the valve and the other against the operating-stud 139 with sufficient force to close the valve when the liquid ceases to flow through it. 140 shows a loading-stem by which pressure may be put upon the valve 136 to resist the flow of the liquid from its press through it when the air-pressure on the liquid returning to the cylinder is insufficient to properly control the recoil. This loading-stem 140 passes through a screw-collar 141, by which the fibrous packing 142 is made liquid-tight. To prevent overloading the high-pressure reservoir, a safety-valve 143 (shown in Fig. 34) may be employed. It is loaded by the spiral spring 144, the pressure on which is adjusted by the screw-cap 145, which guides its stem and which has a screw-stem 145 engaged in the closing-nut 146, which contains the packing-sleeve 147 and packing 148 to prevent liquid flowing out around the adjusting-stem 145.

The pipe 30, (shown in Fig. 32,) which connects the outer of the concentric presses to the valve-block and which is connected to it by the screw-collar 118 and bolts 120, as shown in Figs. 31 and 32, has also a pair of valves 136ª 138ª set in the valve-block, as shown in these figures, 136ª leading to the high-pressure cylinder, with head 98 and 138ª leading to the low-pressure cylinder 41 with the head 99. These valves are provided with trip-rods 151 and 153, which work through screw-collars 154 with packing-nuts 155, which compress soft packings. (Not shown in the drawings.) When the trip-rods 151 153 are not in use and the gun is fired, the liquid from the outer cylinder coming through the pipe 30 will force open the valve 136ª and pass into the high-pressure reservoir 40 until recoil ceases, when this valve closes. By use of the trip-rod 153 the valve 138ª is then opened, when the liquid in this press will no longer prevent the gun's descending to loading position. It will now be seen that if the gun is fired when both trip-rods 152 and 153 are out of use valves 138 and 138ª will be kept closed by the pressure of the liquid which is being forced from the interior and exterior presses, respectively, through the pipes 31 and 30 and the valves 136 136ª to the high-pressure reservoir 40 until the gun ceases to recoil, when both trip-rods 152 and 153 are used to open their respective valves, through which the liquids of the press will pass to the low-pressure cylinder 99 and allow the gun to descend to loading position.

When small charges are used in firing the gun and the air-pressure in the high-pressure reservoir is large, the gun will only force part of the liquid from the two presses into this reservoir, and should the recoil carry the gun only half or two-thirds of the way down a considerable time will elapse after tripping these valves 138 138ª before the gun will fully descend. To avoid this delay, it will be better to trip one of these valves—138, for instance—by the use of the rod 152, leaving it open during firing. Only the outer press in this case will store work of recoil in the high-pressure cylinder, so that the gun will descend nearly to loading position before the recoil is used up, when the valve 138ª should be tripped, and the gun will pass down to loading position. The gun will be raised from loading to firing position by either the inner or exterior press, when either the valve 136 or 136ª is opened by the trip-rod 150 or 151, allowing the liquid from the high-pressure reservoir to pass through it into the corresponding press. While one of these cylinders is thus raising the press the liquid from the low-pressure reservoir will force open the light-pressure valve 138 or 138ª, leading from it to the other cylinder of the press, and fill it while the working cylinder is raising the gun.

When the air-pressure in the reservoirs is in normal condition and the springs properly arranged and adjusted, the service charge will give a greater supply of liquid to the high-pressure reservoir than is needed to operate one of the concentric presses to raise the gun to loading position. The balance of the recoil force thus stored can be used to manipulate the carriage for horizontal and vertical training and the loading of the gun.

Figs. 44 and 45 show a convenient method of loading the valve 136 or 136ª, which is one of the high-pressure valves leading from the press to the high-pressure reservoir. As shown in Fig. 44, no pressure is put upon the valve-stem 140 by the loading-spring 425. Should the screw-stem 427, however, be turned in its threaded sleeve 426, which guides this spring, the sleeve not being allowed to turn by reason of the stud 428 would force the spring 425 against the guiding-sleeve 424 until the latter moves the load-stem 140 against the stem 139 of the valve 136ª, being but slightly resisted in doing this by the small closing-spring 136ᵇ, shown in the valve-stem. By further compressing the spring 425 a pressure is put upon it, which will be indicated on the graduated stud 428, when if liquid is forced through the valve 136ª it would not only have to overcome the air-pressure of the reservoir into which it is discharged, but will have to carry the additional load upon the spring 425 less the pressure of the liquid acting on the area of the stem of the load-rod 140, which slides through the packing-sleeve 141, which compresses the packing 142 to prevent leaks around the load-stem 140. When excessive charges are used or when the air-pressure in the high-pressure reservoir is too small to properly check the recoil either with or without the loading-spring, (shown in Fig. 44,) a regulating-valve 234 (shown in Figs. 44 and 45) may be used. This valve 234, with an operating-stem 234ª, which passes through the sealing-nut 236, around which is a packing 237ª, made tight by the screw-collar 237ᵇ, may be turned either way to any desired extent, partially or wholly cutting off the flow of the liquid, and so produce any desired amount of resistance to the flow of the liquid from the presses to the high-pressure reservoir.

Fig. 24 shows a cut-off valve 111 in the head 98, operated by the screw-stem 112, to which it is secured by the screw-cap 113. This valve is raised up out of the way when the carriage is being used, but to prevent leaks is closed to cut off the flow of liquid to the operating-valves and presses when the carriage is not being operated, and it is closed at any time we wish to cut off pressure from the valve-block and its connections.

As shown, the spring-cylinder 14 contains a fixed plate 18 at its bottom and three movable pistons 19, 20, and 21, which, as shown in Figs. 21 and 26, are all at the upper limit of their respective strokes, the one 19 resting against shoulders on the guide-rods 122, where it is held by the pressure remaining on the springs underneath it, the piston 20 being stopped by shoulders on the rods 212 (the latter being screwed firmly into the piston 19) and held there by the pressure of the springs which are in the middle spring-chamber Y between the pistons 19 and 20. The grouping and arrangement of the springs is shown in Figs. 30, 21, 23, 26, and 27, 30 being a section of the cylinder and its contents on lines $30^x$ $30^x$, $30^y$ $30^y$, and $30^z$ $30^z$ in Fig. 26. In the plan views one set of the springs (those in the group X between pistons 20 and 21) are shown on the right-hand half of the figure, while the upper left-hand half shows the horizontal arrangement of the springs in the group Y between the pistons 19 and 20. The lower left-hand half of the Fig. 30 shows in plan the arrangement of the springs comprising group Z between the pistons 18 and 19. One set of the springs (marked $b$ in Fig. 30) are shown with their guide-rod 124 in section, and one set are shown at $a$ with the guide-rod in elevation and the springs broken off. The balance of all the springs shown in Fig. 30 are shown in outline only. The numbers of these springs of the set X around the guide-bars 122 and 124 are 213, 218, and 219 in most of the sets and are shown around one of these rods in Fig. 27, where the upper portion of the springs are shown. The inner one, 219, fits the rod on its interior and the adjoining oppositely-wound surrounding spring on its exterior, which in turn guides the oppositely-wound spring 213. 126 shows, partly in section and partly in elevation, a sliding stop-sleeve forced by the springs 216 219 against the stop-nut 127, which is adjusted in position to stop these springs from further action against the piston 21 at the desired point. In Fig. 21 two of the guiding-rods 122, with their stop sleeves and nuts adjusted in position for use, are shown. The variable pressure required on the piston 21 to drive the link system in raising the gun from loading to firing position does not permit of a ready construction to allow the springs to use their whole force in raising the gun; but to make the pressure from these springs acting on the piston 21 correspond to that required to move this piston part of the springs must be stopped off before reaching their limit of motion. In the construction shown the piston 19 will reach the stop-shoulders on the rods 122 when the springs of the group Z have reached about two-sevenths of their stroke, while the springs of the group Y will all be cut off from further action when the piston 20 reaches the shoulders on the stop-rods 212, which is when these springs have expanded about one-half their length. Further action of the piston 21 is then had by the continuing expanding of such springs of the group X between the pistons 20 and 21 as have not been stopped off by the stop-nuts 127 or have not reached their full limit of expansion, as some of them do. Thus the springs 223 (shown in Figs. 21 and 30) are fully expanded when the piston 21 is moved but a few inches from them, while the springs 213 may some of them continue operating until the piston 21 reaches its upper limit, unless they have reached their full limit of extension, as one of them is shown to have done in Fig. 27. It will be seen by a little thought that these springs can be so constructed and arranged by limitations, length of movement allowed, &c., as to give at all points substantially the pressure desired on either of the three pistons 19, 20, and 21. It is desirable when stop-nuts are used to stop off springs on opposite sides of the piston 23 at the same time, or nearly so, to prevent large tipping strains of the piston 21, which is secured against tipping by the rod 23, screwed firmly therein, or by other suitable means. To prevent the tipping of pistons 19 and 20, guiding-bearings are made on or connected to them. As shown, sleeves 130 131 are screwed firmly into pistons 20 and 19, respectively, to prevent their tipping by the unequal action of the springs should their loads not be symmetrical or should part of them be stopped off in a way to give tipping. These guides slide smoothly and easily on the exterior of the press 27. They also act as stops to these pistons in their downward movement, 131 striking against plate 18 and 130 striking against the upper side of the piston 19 for this purpose. When the piston 21 is descending, as it nears its position with reference to 20 the rods 225 will compress the springs 223, and when its limit of nearing is fully reached they will strike the stop-rod 212 and force the piston 20 onward in its downward movement. It will be noticed that the load on the upper set of springs, or the set X from the piston 21, is less than that on the piston 20 by the weight of these springs, each group underneath the other having to carry not only the load on that group and the weight of such group, but must carry also the intervening piston and its guide and other attachments. For this reason, while there are three coils of springs in each of the groups around the guide-rod 122 in the chambers X and Y there are four in the chamber Z, as shown in Fig. 23. When the links have passed their vertical position in carrying the gun to its firing-place, they begin to tip forward a little from their own weight, and the pressure of the springs on the piston 21 must at that point be nearly or wholly cut off, and when the links have reached their extreme position to the left there will be a considerable strain of tension on the piston-rod 47, which may be opposed by springs 228 on the guide-rods 124. They work between a collar 227, screwed on the top of the rod, and a sliding sleeve 226, which covers the holes of the piston 21 around the guide-rods and causes the spring 228 to be compressed as the piston nears its upper limit of motion, which may be reached by the coils of the spring striking solid against each other or by the action of the buffer 191, (shown in position in Fig. 26 and in detail in Figs. 40 to 42, inclusive,) or this piston may reach stops at that point provided in any suitable manner. Unless the links pass their center, as mentioned, the carriage may be lifted from its seat when firing at angles of depression, as shown in Fig. 1 by the dotted lines. It will be seen that in firing the gun if for any reason the resistance to the recoil is insufficient the carriage will strike violently when the gun reaches loading position, unless suitable means are interposed to prevent its so doing. The liability to do this is increased by allowing one of the cylinders of the compound press to discharge into the low-pressure cylinder. For this reason I prefer to provide a buffer to materially check the downward movement of the gun and the moving parts of the carriage when this motion is too rapid at the latter part of the descent. This may be conveniently done by filling the chamber between the pistons 18 and 19 partly or wholly with oil and providing orifices $124^a$, through which most of this oil must flow as the piston 19 descends. These orifices are fully open until the piston 20 has approached 19 some distance, when rods 224 (shown in Fig. 26 in elevation and in Fig. 30 in plan) reach the piston 19 and begin to close these orifices. The rods being tapering, the openings through which they are passing become smaller, thus more and more resisting the flow of the liquid through them, and when 19 and 20 have reached their downward position the passages $124^a$ are almost closed by the rods 224. In raising the gun the reverse operation will be had and the lifting somewhat retarded by this arrangement unless by-pass valves are provided in the piston 19, which allow the free flow of liquid from the chamber Y to the chamber Z, so that the rods 224 will only obstruct this flow of liquid to a material extent when moving downward. It will be noticed that this obstruction to motion varies with the square of the downward speed, and therefore acts with great force when needed and with but little force when not needed. When the pressure in the high-pressure reservoir is large, the gun may be raised by either of the central controlling presses so rapidly as to cause a heavy shock to the carriage when the gun reaches its upper limit of motion unless a suitable buffer is used to prevent this, to do which I provide a buffer 191, (shown in position in Fig. 26,) as before mentioned, with the detailed construction shown in Figs. 40 to 42. 191 is a steel cylinder with a head 192 secured thereto by bolts 193 and made tight by the packing-ring of soft metal 194 and having a piston 196 with a piston-rod 197, which is checked in the upward movement of the piston 21, to which the buffer is rigidly attached, as shown in Fig. 40, by the piston-rod 197 striking the set-screw 199, which is properly adjusted in position in its seat in the valve-block 107 to strike this rod at the desired time, causing it to stop while its cylinder 191 moves on, forcing liquid therein to pass from the chamber below the piston 196 to that above it through openings partially closed by the rods 205 and which are nearly closed when the piston 21 has reached its upper limit of motion. As the rods 205 are tapering, the amount of this closure will depend upon the position of the adjusting-rod 199, the bottom of which is shown in Fig. 40 and the top in Fig. 43 and its position and use in Fig. 31, so that the resistance to this buffer may be graduated to become greater or less by screwing this rod 199 up or down in the valve-block 107. When the gun is lowered, as soon as the piston 21 begins to move downward the piston 196 in this buffer will be forced upward by the spring 204, which causes the liquid above the piston 196 to pass through the openings around the rods 205 into the space below it. To allow the more free movement of this piston, by-pass valves (shown in Figs. 41 and 42) are shown. They are provided with seats 208, screwed into the piston 196, which carry the valves 207, the stems of which slide in the screw-sleeves 209. When the piston descends, these valves are closed by small spiral springs contained in their stems. These springs act against the loose rods 211 when closing the valves. The piston-rod 197 is packed by the screw-sleeve 201 and packing 202. The friction of this packing or other friction may cause the spring 204 to move the piston 196 too slowly when the gun is descending rapidly, and the gun might be loaded and again raised to firing position without the spring 204 having accomplished its purpose, which is to throw the piston always to the top of the cylinder 191 before we begin to raise the gun to firing position. If this has not been done, the buffer will not give the desired resistance and accidents may ensue, to prevent which a stop-rod 198 is screwed into the lower side of the piston. It passes through the head 192, where it is securely packed against leaking. This rod is shown in Fig. 26, and when the piston 21 moves down sufficiently far it will strike the short guide-rod 125, which is shorter than the others of its set, but which is adjusted at the right length to stop the rod 198 and cause it to force the piston 196 to the upper limit of its motion. If it were not for the return-valves shown in Figs. 41 and 42, this buffer would also be a good buffer to check the too-rapid motion of the gun at the latter part of its downward motion; but I prefer for this purpose the one previously described. This buffer is shown one-half of it in section in Fig. 30. The guide-rod 123 opposite it is made short and the upper series of springs around it not used, as it would be in the way of the descending piston-rod 47. The rest of the rods 123 usually reach to or above the piston 21 when at its upper limit of motion.

Figs. 46, 46$^a$, and 47 show the method of moving the trip-rods 150, 151, 152, and 153, also the arrangement of a press to work in conjunction with the hand training apparatus of the gun-carriage, together with the means of operating the valves of this press, which is shown in detail in Figs. 48 and 49. The trip-rod 150 has a bifurcated head 290, connected by a pin 291 to a pitman 292, working on the crank-pin 296 of the eccentric-shaft 300, which is operated by the handle 304 308. Trip-rod 151 is similarly operated by the handle 311 on the arm 307, which is secured to the rod 301, which carries the pitman-pin 297 of the pitman 293. Trip-rod 153 is similarly worked by the handle 310 on the bar 306, which is securely fastened to a shaft concentric with 303, through which it passes, and having a crank which engages the pitman 294 of the trip-rod 153. The handle 309 is used to operate the arm 305, rigidly secured to the shaft 303, which has a bearing 315 and has at its inner end an eccentric bearing or crank-pin to operate the pitman and its trip-rod 152, to which it is secured through a pin 291 by its head 290. By turning the lever 305 by the handle 309 through an arc of one hundred and twenty degrees the valve 138, Fig. 31, will be fully opened, and only the exterior press would be used in recoil, when by tripping the valve 138$^a$ by using the handle 310 and lever 306 the gun will descend to loading position. If neither of these valves is opened by its trip-rod, which will be the case when the levers 305 and 306 are in the positions shown in Fig. 46, the liquid of both cylinders will be forced into the high-pressure reservoir until the gun ceases to recoil, when by raising the handle 310, with the handle 309 resting on the arm 306, as shown, both levers 305 and 306 will be worked and both valves 138 138$^a$ opened, allowing the gun to descend freely to loading position. It will be seen that any of the valves 136 136$^a$ or 138 or 138$^a$ may be opened as little or as much as desired by the use of the levers which control their movements, so that the gun may be made to descend rapidly or slowly by a careful operator after recoil ceases, and the speed of rising may also be regulated by these levers; but there will still be danger unless the buffers described or their equivalents are provided.

In Fig. 46 the press 242, which is used to rotate the gun-carriage, is shown connected to the valve-block 107, to which it is secured by the plate 266 by bolts 271, 272, and 273. This plate is shown also in Fig. 47 and in detail in Figs. 48 and 49. It carries passages which connect the valve-block 107 to the press 242. This press, with its operating-valves, is shown in plan in Fig. 48 and elevation in Fig. 49. It consists of a block of steel or other suitable metal, (best well-forged steel.) It has a central bore in which the piston 243 works, having a piston-rod 244 secured to it by the screw 245. Piston-rod 244 passes through a packing 247, secured by the screw-collar 246, and through a screw-collar 318, which secures a packing in the head of the cylinder 316, one end of which is shown in Fig. 46. The rod 244 has the other end screwed into a rack 317. (Shown in dotted lines in plan only in Fig. 50.) This rack works a pinion 358, keyed on the shaft 359, which rests in boxes 360 and 362, the covers to which are secured by screws 361 and 363. The rack 317, pinion 358, its axis 359, and the piston-rod 244 are shown in Fig. 50ª. The press-piston 243, working backward and forth in its cylinder, thus drives in alternate directions the shaft 359 and drives the beveled pinion 364, by means of which it operates in either direction the rotating and elevating raining apparatus of the carriage.

Liquid to drive the piston of the press 242 is brought from the high-pressure reservoir through the valve 238. (Shown in Figs. 48 and 49.) Fig. 48 shows a passage 234ª 234ᵇ, which brings liquid from the high-pressure reservoir 40 through the pipe 108. An opening is made in the valve-block into this passage by boring a hole 234ᶜ, (shown in Fig. 49,) which is closed by the sealing-block 234ᵈ. The valve 238 has a stem 238ª, which is connected by its head 278, into which the outer end is screwed, with the pin 280 to the pitman 287 and crank-pin 282 on the eccentric-shaft 283, which rests in bearings 284 and 285. A lever 286, secured to the shaft 283 by a suitable key and locking-nut 288 and operated by the handle 289, rotates the shaft 283 to open or close the valve 238. In erecting this work the parts are placed in the position shown and the valve 238 closed tightly by backing it from its screw-head 278 against its seat in the valve-block 107, and when tight it is locked in this position by the jam-nut 279, and when thus secured, if properly ground and seated, it should always be tight, with the lever 286 in the position shown in Fig. 47 and by which it is easily controlled to open and shut very quickly. When this valve is open, liquid can pass from the chamber around it, the outer opening to which is closed by the sealing-plug 239 and its packing 239ª through a vertical passage in the valve-block 107 to the passage 268 in the pipe-block 266. The connection between the passage 268 in this block and the one leading to it from the valve-block 107 is made tight by the bronze packing-ring 275. (Shown in Fig. 49.) The passage 268 in the block 266 leads through a packing-ring 277 to a valve-chamber in the press 242. This chamber is closed or opened at the alternate ends by two valves 250ª and 250ᵇ on the stem 250. They have an operating-stem 252, by which they are moved to the right or left, as desired. The block 266 has a passage 267 leading from the low-pressure passage through a packing-ring 274 and through a packing-collar 276 into a valve-chamber, also in the press-block 242. This chamber (shown in Fig. 48) is closed and opened at the alternate ends by the valves 251ᵇ and 251ª on the bar 251, which has an operating-stem 253, passing from the press through a sealing-plug 260 and a screw packing-plug 262 to suitable mechanism, by which it is operated. The valve 250ᵇ has a seat in the sleeve 254, (shown in Fig. 48,) which is secured in the press-cylinder by a screw-thread and packed against leakage by a bronze packing-ring 256. The valve 251ᵇ is similarly seated by the screw-sleeve 255, packed by a ring 256. The valve-stem 252 passes through a packing 263, secured by the nut 261 in the sealing screw-plug 259, which closes the high-pressure valve-chamber. Passage 258 (see Fig. 48) opens this valve-chamber into the right-hand end of the press 242, with the valve set to allow the passage of the high-pressure liquid to drive the piston to the left, when the low-pressure liquid will be driven through a passage 265ª, through the valve-opening of the valve 251ª, up into and through the passage 267 of the block 266, into the low-pressure passage (marked "L. P.") of the valve-block 107, into the low-pressure reservoir. By reversing the position of the valves 251ª 251ᵇ and 250ª and 250ᵇ the liquid flowing through the valve 238 will force the piston 243 in the opposite direction. The mechanism for reversing these valves is shown in Figs. 46, 46ª, where the two valve-rods 252 253 have pitman connection with the crank-pins 326 327 through the heads 328 329, in which they are properly adjusted and locked by nuts 330 and 331. The two crank-pins 326 327 are on the eccentric-shaft 320, which is rotated by the gear-wheel 321, keyed thereto and driven by the pinion 322, keyed on its shaft 323, operated by the crank 324 324ª. The shaft 320 rests in the bar 248, which, with its packing-ring 248ª, constitutes the movable head of the press. The crank-pins 326 327 being on opposite sides of the axis of the shaft 320 are made to operate the valves, through the stems 252 253, by one-half revolution of the gear 321, which is made by two turns of the crank 324 324ª.

The valves are adjusted to lock tightly in position by turning their stems 252 253 in the screw-heads 328 329 until they are tight and locking them there by the jam-nuts 330 331. The passages 267 and 268 in the pipe-block 266 are secured to their packing-rings 274, 275, 276, and 277 by the screws 271, 272, and 273.

The regulating-valve 234 shown and described in Figs. 44 and 45 is also shown in Figs. 48 and 49, together with its stem 234$^a$ and its packing-nut 237, by which the packing around it is made tight in the sealing guiding-stem 236, which is made tight in the valve-block 107 by the packing-ring 236$^a$.

To traverse the carriage by hand, a traversing wheel 376, mounted on and keyed to its shaft 366 and carrying a gear-wheel 377, secured to the shaft or driving-wheel 376 and operated by either or both of the pinions 378, mounted on shafts 379 and driven by the crank-arms 380, with handles 381, is provided. To work properly, the outer end of this shaft must be mounted flexibly as regards the carriage-body 64, which, as previously explained, moves up and down at this point under the changing action produced by the weight of the gun and its operating-links when moved from firing to loading position and in firing. For this purpose I provide a flexible beam 390, carrying a two-part box 391 392, secured to it by screw-bolts 393 and having a hard bronze lining 398, against which rest the steel bearing-rollers 397, which fill the space tightly between the shaft 366 and the roller-bearing lining 398. This lining may be dispensed with, if preferred. The beam 390 is made to produce the proper pressure between the bed 7 and the wheel 376 by means of the two adjusting-bolts 399 and their nuts 400. The amount of stretch of these bolts may be used to determine the amount of this pressure. The lower ends of the bolts 399 screw into the shoe 64$^b$ of the carriage-body 64. In elevating the gun from loading to firing position the body 64 is moved down by the springing of it and by the elastic springing of the spring-cylinder 14. This part of the carriage is moved down still farther by compressive strains in the links 51 and 52 when the gun is fired at any considerable elevation. The stretch of the bolts 399 and the additional bending of the beam 390, caused by this yielding of the carriage, allows of these yieldings without overloading the traverse-wheel 376 and its connections. Four studs 401, secured to and resting on the beam 390, support plates 402 at its opposite ends, which are secured to the studs 401 and beam 390 by the screw-bolts 403. The nuts 400 may rest on the beam 390, but had better rest on the plates 402, as shown, because the extra length of the rods 399 when so used gives a better adjustment elastically to the position of the beam 390.

The beam 390 may be made very stiff and elastic action depended on mainly by the bolts 399, or the beam 390 may be very elastic and the bolts 399 very strong and rigid; but I prefer them constructed as shown, the beam 390 being quite elastic and the bolts 399 very much so, owing to their small diameter, their very considerable length, and the great strain per unit of area upon them, which strain must in all cases be sufficient to produce an amount of pressure between the traversing wheel 376 and the foundation bed-plate 7 to cause the friction thereof to prevent the wheel from slipping when rotated either by hand or driven by the press 242 to start the carriage in motion.

Shafts 379 rest in boxes in plates 402 and are secured against horizontal movement by the collars 404 and screws 405. In traversing the carriage it may be brought to a high speed quickly by means of the driving-press 242, which, as before shown, drives the bevel-gear 364 and operates the gear-wheel 365, which turns loosely on the shaft 366. A coned clutch-wheel 369, keyed to the shaft 366 by the block 370, is driven by the shaft 371 firmly against the wheel 369, which will then rest against the collar 367, secured by the screw 368 to the shaft 366, when the friction between the cone-faces on the wheels 369 and 365 will cause these parts to revolve together and drive the traverse-wheel 376, rotating the carriage rapidly. When the stroke of the press 242 has been sufficient to give the desired speed to the carriage, the motion of the screw-shaft 371 is reversed sufficiently to remove the pressure between the clutch-wheels 369 and 365. The carriage then continues by its own momentum, aided in some cases, if necessary, by the hand mechanism described, to move nearly to the position desired, when it is speedily brought to rest and its momentum checked by the use of another clutch, which consists of an inner coned clutch-wheel 383, secured to the carriage-body 64 and against rotation by the bolts 384 and made to have connection with the driving-shaft 366 by means of the coned clutch-wheel 382 and the block 370, which keys the latter to the shaft and by which it is forced against the fixed wheel 383 by means of the screw-shaft 371 with sufficient force to cause the friction of this clutch quickly to bring the carriage to rest. For convenience the screw-shaft 371 is placed in the center of the shaft 366 and is operated by a double crank-arm 372 by handles 373. It passes through a threaded nut 374, fixed in the shaft 366 by the screw-collar 375, threaded on its exterior only. A shoulder might be fixed on this shaft and used in place of the screw-collar 374; but the action would be slower, and to make the action of the shaft 371 very quick it is threaded in the fixed collar 374 and in the opposite direction in the driving-block 370, the right and left hand threads operating this block with double speed. Screw-shaft 371 might be operated by any other convenient means to give the right and left thrust to the block 370 to work the two clutches with which it is connected.

The method shown is very simple and quickly and easily controlled.

The required pressure put upon the driving-wheel 376 bends its shaft 366 very materially, which gives no trouble at the bearing of the beam 390, as it is easily tipped on the balancing-rods 399 to give almost uniform pressure on both ends of the rollers 397. This box is secured in position laterally by the rod 395, connected with the box by a stud 394, into which it is screwed at one end and to the carriage-body 64 at the opposite end by jam-nuts 396. This bending of the shaft 366 requires for the easy working of its journal at its inner end a ball-joint, which is best formed of a hardened-steel ball 387, made on a cylindrical shaft and screwed into the inner coned end of the shaft 366 very tightly by the head 386. This ball-head 387 is best made spherical and fitted tightly into the hard brass or bronze bearings 388 and 389, the latter of which is screwed into the carriage-body 64 tightly against 388 and made to closely fit the ball 387, which also receives the longitudinal thrust in the shaft 366, which is produced by the pressure on the coned traversing wheel 376. With this ball-joint at the inner end of this shaft and the roller-joint flexibly mounted to tip at the outer end of the shaft 366 neither the load on it acting directly or by bending it makes any disturbance of the journals, which when so constructed have little friction in use. Great care should be taken to keep all the bearings dry, which applies not only to these bearings, but to all exposed bearings in the carriage. For this purpose moisture-attracting bodies, such as anhydrous lime or concentrated sulfuric acid, may be placed in the spring-cylinder and in the space between it and the inner curb which surrounds it. The large quantity of spraying-oil (spraying under the action of recoil) in the spring-cylinder may very well lubricate the parts therein. Liquid and moisture may be kept from between the spring-cylinder and the inner protecting-curb around it by filling this space with a non-volatile mineral oil, which, if used, will prevent the necessity of using moisture-absorbents therein. The rack 317, which drives the gear or pinion 358, is easily protected from rust and well lubricated by filling its containing-cylinder 316 and the box 360 attached thereto with oil.

To operate the mechanism which trains the gun vertically, two pinions 79 (shown in Fig. 50 by their pitch-lines only) are firmly keyed on the opposite ends of the shaft 80. I may here remark that all the gears and pinions shown in Figs. 46 to 50, inclusive, are shown by their outlines or by their outlines and pitch-lines only, no teeth being shown on any of them. The pinions 79 engage directly the racks 65 to operate the elevating-rods 78, as shown in Fig. 3. They are driven by the shaft 80, which itself is driven by the two gears 332, driven by the pinions 333, which are keyed on the shafts 334, journaled to the carriage-body 64 at any convenient point. As drawn in Fig. 50 the shaft 334 is on a level with the shaft 80. When operated by hand, it is driven by the gears 335, keyed firmly on its outer ends and driven by the pinions 336, keyed to the shaft 337, which is properly supported at any convenient point and which I have placed concentric with the shaft 80, that the operator or operators who turn it may be close to the rack-guides 66 for the purpose of observing the graduating-arcs which are placed on them at the time of firing to show the elevation of the gun. These arcs may be made permanently on the guide-racks 66; but I prefer them to be made separately and only placed on the guides 66 when they are in use for firing. They are not shown in the drawings, as they form no part of the invention. Shaft 337 is driven by either of the crank-arms 338 or 345 through their operating-handles 338$^a$ 345$^a$ when operated by hand, the arms 338 345 being firmly keyed to their bearing-shaft, but in such a way as to allow of slight longitudinal movement. The racks 65 and their driving-pinions 79 are locked at any desired position by locking the pinions 336, which is accomplished by means of the shaft 348, concentric with the shaft 337, through which it passes and to which it is splined against turning by a spline 349, shown at one end, or, better, by similar splines at both ends. One end of this shaft may have a fixed head 346 and the other a screw-head 347, but, better, each end a screw-head, one 346 and the other 347, each threaded, when by the turning of either one through a half-revolution when properly adjusted the pinions 336 will be forced against the ends of the shaft 80 with sufficient force to lock them. The locking friction on these pinions is doubled by the interposition of two arms 342 and 343, secured against rotation, and which by the use of the screw-heads 346 347 and their lever-arms are jammed tightly against the pinions 336, forcing them against the ends of the shaft 80. The friction on the two ends of these pinions may be much increased by properly coning them, as shown in the drawings. Locking-pins 353 354, carried at the outer ends of spring-bars 350, secured by bolts 351 and washers 352 to the crank-arms 338 345, are used to hold the arms 346 and 347 in a position which relieves the coned pinions 336 from pressure on their ends whenever desired. When the pinions 79 require but a small movement, they will uniformly be moved by hand; but when they require at one time a large movement, such as half of their whole movement, it will be easier and much quicker to operate them by the press 242, which may be done while loading the gun. To do this, the shaft 334 is made to revolve by the power of this press by bringing into use a clutch, shown on this shaft, which consists of a gear-wheel 412, driven by the idler-wheel 407, turning loosely on the shaft 80 and operated by the gear-wheel 406 on the shaft 359, which is driven by the pinion 358 and the press 242. The gear 412 has an inwardly-coned clutch-wheel 413, made to drive the shaft by forcing the coned disks 416 tightly against it by its keying-block 414, which is operated by the screw 418, driven by the handle 419, secured thereto by the screw 420 and having a bearing at its outer end 421, which supports one end of the bar 420, surrounding it, and which fixes also the nut or collar 422 firmly in the shaft 334. If 422 is simply a fixed collar, it will be fixed to the screw-rod 418 and left free to turn in the shaft 334, but fixed against longitudinal movement therein by the collar 421, threaded on its exterior and screwing into the shaft 334. The screw-rod 418 is made to act much more quickly by being threaded in the key-block 414 and in the collar 422, in which case it turns loosely in 422 and is fixed against turning in the shaft 334, the right and left hand threads on the rod 418 thus giving doubly-quick motion to operate the locking key-block 414, which operates the clutch. The shaft 80 carries the loose sleeve 408, which has on one end the gear 407 and on the other end a drum, around which is passed the cable 410 411, which is moved in either direction desired by the press 242. The ends 410 411 of this cable are continued out to and are made to connect, when desired, with the loading mechanism to be used in loading the gun by power either to raise the shot and cartridge from the magazine or to push the projectile and the powder, either or both, into the gun. Usually when firing with service-charges all this work will be done through this cable by the press 242 and operated by the work of recoil stored in the high-pressure cylinder. The mechanism which trains the angle of elevation of the gun may be operated by this press through the clutch mentioned when the cable 410 411 is being used for loading without interfering with the loading movements, the power being ample for both purposes.

Unless the clutch on the shaft 334 can be operated very quickly the valve 238 would have to be closed momentarily during the loading to allow time to operate the clutch.

The link piston-rod 47 works through a hole in the cover 86 of the spring-cylinder, which hole is closed by a sliding cover (shown in Figs. 28 and 29) consisting of parts 92 and 93, secured together by screws 94 and to the head 86 by guides 95 and 96 and screws 97. Parts 92 and 93 seize and secure the two-part spherical bronze ball 91, in which the piston-rod 47 fits and through which it slides.

Having thus described my invention, the following is what I claim as new therein and desire to secure by Letters Patent:

1. A foundation adapted to receive an elevating gun-carriage, consisting of a foundation-plate 8, a supporting-base 1, a protecting and supporting curb, connecting said foundation-plate and supporting-base, and an outwardly-extending plate 7 over which the carriage-body is traversed, and on which it may rest at time of firing, substantially as and for the purpose explained.

2. In combination with an elevating gun-carriage, or lift, for a gun; a foundation consisting of a foundation-plate 8, a supporting-base 1, a protecting and supporting curb connecting said foundation-plate and supporting-base, an outwardly-extending plate 7 over which the carriage-body is traversed and on which it rests at times in firing; the outer protecting-curb with the space between it and the inner curb and supporting-base suitably filled, substantially as and for the purpose set forth.

3. In a mounting for a gun-carriage, the combination of a foundation and its covering-plate consisting of the central bearing-plate 8 and the outwardly-extending overhanging plate 7 over which the carriage-body is traversed, and on which it may rest at times of firing, substantially as and for the purpose set forth.

4. In combination for use with a gun-carriage; a foundation consisting of the bearing-plate 1, foundation-plate 8 and the inner curb connecting said plates, the outwardly-extending plate 7, and the outer curb connected with the plate 7 by foundation-bolts 162, substantially as and for the purpose set forth.

5. In combination, a spring-cylinder 14, for supporting a gun-carriage, a bearing-plate 1, upon which the spring-cylinder is pivoted, a foundation-plate 8 guiding and supporting the cylinder 14, and the supporting-curb which connects the bearing-plate 1 and the foundation-plate 8, substantially as and for the purpose set forth.

6. A gun-carriage constructed with a central bearing and supporting cylinder, and a bearing-pivot 15 upon which the cylinder is mounted to rotate, and the shoe or step 16 on which the pivot rests in combination with the intervening antifriction-plates 17, substantially as and for the purpose set forth.

7. A gun-carriage constructed with a central bearing and supporting cylinder 14, a bearing at bottom of said cylinder upon which it rotates, a supporting and guiding plate 8, at the top of the cylinder 14; and the antifriction-rollers 84 between the adjacent faces of the cylinder and plate; substantially as and for the purpose set forth.

8. A gun-carriage constructed with a central supporting, rotating and guiding cylinder 14, upon which the gun is carried, suitable elevating mechanism for the gun, above said cylinder, and actuating mechanism and controlling connections for said elevating mechanism located within and rotating with the cylinder; substantially as and for the purpose set forth.

9. An elevating gun-carriage, constructed with elevating mechanism and supported wholly upon a central rotating and guiding cylinder 14, below the body of said carriage and elevating mechanism, and recoil and actuating means also mounted in said cylinder, substantially as and for the purpose set forth.

10. An elevating gun-carriage, constructed with and supported wholly upon a central supporting, guiding and rotating cylinder 14, below the body of said carriage, and a link elevating mechanism for connecting the gun with the carriage-body, substantially as and for the purpose set forth.

11. An elevating gun-carriage, constructed with a rotating, guiding and supporting cylinder 14, and a pair of elevating-links 51 and 52, for connecting the gun with the carriage-body, and means to operate said links, substantially as and for the purpose set forth.

12. An elevating gun-carriage, constructed with a pair of elevating-links, and a saddle to which the links are connected and in which the gun rests, and the central rotating, guiding and supporting cylinder 14, substantially as and for the purpose set forth.

13. In an elevating gun-carriage, the combination of the links 51 and 52 supporting and raising the gun, the coupling cross-beam 48 by which they are connected together, pins 50 and 57 coupling the said cross-beam to the links, and suitable mechanism for elevating them connected to said cross-beam, substantially as shown and described.

14. In an elevating gun-carriage, the combination of the links 51 and 52 for supporting and raising the gun, the coupling cross-beam 48 connected by pins 50, 57 with the links for elevating them, and the piston-rod 47, connected with the beam 48 and suitable elevating mechanism, for the purpose set forth.

15. An elevating gun-carriage constructed with a body 64, provided with a supporting and rotating cylinder 14, in combination with suitable gun supporting and elevating link connections and mechanism for elevating the gun to firing position; all mounted upon said cylinder, substantially as set forth.

16. An elevating gun-carriage, constructed with a body 64, attached to a supporting-cylinder 14, in combination with a pair of elevating-links 51 and 52, connected with the carriage, a saddle 68 in which the gun is mounted and which is connected with said links, and suitable elevating mechanism, substantially as and for the purpose set forth.

17. In an elevating gun-carriage, the elevating-link 51 connecting the gun to the carriage, constructed with cross-beams 51ᵃ and the longitudinal bar 51ᵇ connecting said beams and carrying the bearing 51ᶜ, substantially as and for the purpose set forth.

18. In an elevating gun-carriage, the combination of the cylinder 14, piston 21 having a piston-rod 47 for raising or elevating the gun, the cylinder-head having an opening which permits lateral movement of the piston-rod, a sliding cover for said opening and a ball-joint in said cover through which the piston-rod slides.

19. An elevating gun-carriage, having a saddle 68, a pair of elevating-links 51 and 52, connecting the saddle to the carriage, the piston 21, the piston-rod 47 having jointed connection at its respective ends with said links and to the piston, and a cylinder 14, substantially as and for the purpose set forth.

20. In an elevating gun-carriage, the combination of link connections adapted to move to a position beyond the vertical in raising the gun to firing position, to avoid lifting of the carriage when firing the gun at angles of depression, and a counterbalance constructed and arranged to bring the link connections back to and sufficiently past the vertical to allow the gun to descend by its own weight to loading position without firing.

21. In an elevating gun-carriage, the combination of an elevating link system adapted to move beyond the perpendicular in raising the gun to firing position to avoid lifting the carriage when firing at angles of depression, and a counterbalancing-spring 228, which opposes the forward movement of the link as it nears the upper limit of its stroke, and aids in returning the link system back to and sufficiently past the perpendicular to allow the gun to descend by its own weight to loading position without firing.

22. In an elevating gun-carriage, or lift, in combination with suitable apparatus for lifting the gun to firing position having a controlling-piston 21, a hydraulic buffer attached to said piston, consisting of a suitable cylinder and its piston, and having a suitable by-pass arranged to retard the movement and absorb the work of the lifting parts as they near, and permit them to come to rest without shock or recoil when they reach firing position, as explained.

23. In an elevating gun-carriage or lift, in combination with suitable apparatus for lifting the gun to firing position, having a controlling-piston 21; a hydraulic buffer operated by said piston, consisting of a suitable cylinder and its piston, and having a suitable by-pass arranged to retard the movement and absorb the work of the lifting parts as they near, and permit them to come to rest without shock or recoil when they reach, firing position, as explained.

24. In an elevating gun-carriage, in combination with a link system and a hydraulic press to raise the gun to firing position, and the piston 21; a hydraulic buffer operated by said piston consisting of a cylinder, a piston, a by-pass arranged to retard the movement and absorb the work of the lifting parts as they near firing position but permitting them to come to rest without shock or recoil when they reach such position.

25. In an elevating gun-carriage, having a link system for raising the gun to firing position, in combination with the cylinder 14, the piston-rod 47 and its moving head or piston 21 and the buffer attached to said head or piston, as and for the purpose set forth.

26. In combination with an elevating gun-carriage, having suitable link connection for raising the gun and suitable elevating mechanism to control the movement thereof; a buffer for retarding the upward movement of the gun when it approaches its limit of movement, consisting of a cylinder 191, a piston 196, piston-rod 197 and regulating-stud 205, working in an aperture in said piston, said buffer being located, substantially as and for the purpose set forth.

27. In combination with an elevating gun-carriage; a buffer for retarding the moving parts when nearing their upper limit of movement, consisting of a suitable cylinder, having a piston and a piston-rod 197, and the adjustable stop 199, against which the buffer strikes to cause its piston to act, as and for the purpose set forth.

28. In combination with an elevating gun-carriage; a hydraulic buffer for retarding the moving parts when nearing their upper limit of movement, consisting of a cylinder 191, and its piston 196, and piston-rod 197 and adjusting stop-rod 198 to insure bringing the piston to its proper position, substantially as and for the purpose set forth.

29. In combination with an elevating gun-carriage; a hydraulic buffer for retarding the moving parts when they near their upper limit of movement, consisting of a suitable cylinder 191 having a piston 196, piston-rod 197 and return-spring 204, substantially as and for the purpose set forth.

30. In an elevating gun-carriage, in combination with a link connection for raising the gun to firing position, the rotating cylinder 14 below the carriage-body and upon which said carriage-body is mounted and rotates containing balancing-springs suitably combined with said link connection, substantially as and for the purpose set forth.

31. In an elevating gun-carriage, the combination of a link system for raising the gun to firing position, a piston-rod 47 extending downwardly from the link system and having a piston 21, a rotating cylinder 14 above and upon which the carriage is mounted and with which the carriage rotates, provided with suitable balancing-springs opposing the movement of the piston, substantially as and for the purpose set forth.

32. In an elevating gun-carriage, the combination of a link 51, for raising the gun to firing position, and a suitable system of balancing-springs having connection with said link at a point materially without the line of its pin centers, and extending vertically beneath the link, whereby the springs are enabled to more readily control the raising and lowering of the gun, as explained.

33. In a gun-carriage, the combination of the spring-cylinder 14, the moving piston 21 located in the cylinder and suitably connected to raise or elevate the gun, and a superposed series of balancing-springs divided into groups by one or more interposed pistons, substantially as set forth.

34. In a gun-carriage, the combination of a spring-cylinder 14, a series of balancing-springs contained therein, a movable piston against which said springs act, provided with a guiding-sleeve 130, substantially as and for the purpose set forth.

35. The combination of the spring-cylinder 14, and its contained springs, and the guide-rods for the springs provided with stop-shoulders, substantially and for the purpose set forth.

36. In a gun-carriage, the combination of a cylinder and its piston 21, guide-rods in said cylinder, springs surrounding said guide-rods and stops adjustably mounted on said guide-rods, substantially as explained.

37. In combination with a gun-carriage, having suitable elevating connections to control the movement of the gun, a series of balancing-springs acting on said elevating mechanism constructed and arranged with varied lengths of movement, whereby they successively cease action at different points, and the work of some is discontinued, while others continue their action, as explained.

38. In a gun-carriage, the combination of a connecting-rod controlling the movement of the gun, a series of independently-movable springs operating upon said connecting-rod to control its movement, and stops arranged to engage some of the springs and stop them, while the others complete their movements, substantially as and for the purpose set forth.

39. In combination with a gun-carriage, a piston having connections for controlling the movement of the gun, and a series of balancing-springs operating upon said piston and graduated in their range of movement, substantially as described, whereby after concerted action some arrive at their limit of expansion and cease to act on the piston, while the continuing pressure of the rest of the springs conforms more nearly to the work required to complete the stroke of the piston.

40. In a gun-carriage, the combination of a piston, controlling the movement of the gun, a series of reversely-wound concentric springs adapted to operate on said piston, and a guide-rod upon which said springs are mounted, substantially as and for the purpose set forth.

41. In an elevating gun-carriage, in combination with suitable elevating mechanism to elevate the gun and a hydraulic press to control the movements thereof, a series of balancing-springs operating on said mechanism and arranged to substantially balance the gun at all positions of its movement and high and low pressure reservoirs connected to said press to control the movements thereof as explained.

42. In combination with a gun-carriage; the cylinder 14, and its contained piston 21, suitably connected to the gun, the graduated springs in said cylinder acting on said piston to aid in balancing the gun in all positions, and a hydraulic press, also acting on said piston, to control the movements of the gun, substantially as explained.

43. In an elevating gun-carriage, the combination of a link system, for raising the gun to firing position, a piston-rod 47, extending downwardly from said link system, a piston 21 on said piston-rod, a supporting-cylinder 14, upon which the carriage is mounted, suitable balancing-springs in said cylinder, and a hydraulic press in said cylinder connected with the link system, for controlling the movements of the gun, as explained.

44. An elevating gun-carriage supported upon a vertical rotating cylinder 14, and a press and a reservoir communicating with said press within said cylinder, for the purpose set forth.

45. An elevating gun-carriage, constructed with a carriage-supporting vertical rotating cylinder 4, having a hydraulic press and communicating reservoir both within it; said reservoir adapted to contain air under heavy pressure to resist the flowing of the liquid from the press into the reservoir during the recoil of the gun, and to expel the liquid from the reservoir into the press, while raising the gun to firing position, as and for the purpose explained.

46. In a recoil gun-carriage, in combination with a suitable press for operating mechanism thereof, a high-pressure reservoir communicating with said press and adapted to contain air under high pressure to resist the flow of the liquid from the press into the reservoir during the recoil of the gun, and to expel the liquid from the reservoir into the press to operate it, and constructed with a body 40, fixed head 98 secured thereto by the engaging screw 98ª and having a packing-ring 100 secured in a dowel-groove formed between the head 98 and body 40, substantially as and for the purposes set forth.

47. In a recoil gun-carriage, in combination with a suitable press for operating mechanism of said carriage, a high-pressure reservoir communicating with said press and adapted to contain air under high pressure to resist the flow of the liquid from the press into the reservoir during the recoil of the gun and to expel the liquid from the reservoir into the press to operate it, and constructed with a body 40, movable head 102 secured to said body by a screw-collar 229 and bolts 104, and having a packing-ring 102ª between the head 102 and body 40 to secure the joint, substantially as and for the purpose set forth.

48. In a recoil gun-carriage, in combination with a suitable press for operating mechanism of said carriage, a high-pressure reservoir communicating with said press and adapted to contain air under high pressure to resist the flow of the liquid from the press into the reservoir during the recoil of the gun and to expel the liquid from the reservoir into the press to operate it, and constructed with a body 40, movable head 102 secured to said body by a screw-collar 229 and bolts 104, with one or more packing-rings 104ª, 104ᵇ, and having a packing-ring 102ª between the head 102 and body 40 to secure the joint, substantially as and for the purpose set forth.

49. An elevating gun-carriage, constructed with a hydraulic press, and two reservoirs communicating with said press, one of which is adapted to contain air under high pressure to resist the flow of liquid from the press into the reservoir during the recoil of the gun, and expel the liquid from the reservoir into the press, while raising the gun to firing position, and a vertical rotating cylinder 14 containing said parts, as explained.

50. In combination with an elevating gun-carriage, a cylinder 14 on which the carriage mainly rests, rotating about its vertical axis having within it a compound press having two pistons arranged to operate together or separately in controlling the movements of the gun, as explained.

51. In an elevating gun-carriage, a cylinder 14, rotating about its vertical axis and containing a compound press having two pistons, arranged to operate together or separately to control the movements of the gun and the high and low pressure reservoirs adapted to communicate with either or both of the presses, as and for the purposes explained.

52. In an elevating gun-carriage, a compound press having two pistons arranged to act separately or together to control the movements of the gun and the high and low pressure reservoirs adapted to communicate with either or both of said pistons for the purpose explained.

53. In an elevating gun-carriage, a compound press formed of two concentric pistons arranged to act together or independently and high and low pressure reservoirs arranged to communicate with either or both of said pistons, substantially as and for the purpose set forth.

54. An elevating gun-carriage, constructed with a compound press and two reservoirs communicating therewith one of which is adapted to contain air under high pressure to resist the flow of the liquid forced thereinto by either or both of the pistons of said press during the recoil of the gun, and to expel the liquid into the press while raising the gun and the other adapted to contain air under sufficient pressure to expel the liquid from it with sufficient velocity into either cylinder of the press when the other cylinder of the press is raising the gun, as explained.

55. In a gun-carriage, the combination of the containing-cylinder 14, the compound press, pipes 30 and 31, for communicating pressure to the pistons of said press, and the joint-block 25, in which the pipes are fixed and which has passages communicating between the pipes and their respective pistons, as explained.

56. In a gun-carriage, the combination of the compound press, the pipes 30 and 31 for controlling the pressure of the liquid in the pistons of said press, and the valve-block 107, substantially as and for the purpose set forth.

57. In a gun-carriage, the combination of the containing-cylinder, 14, a hydraulic press, a valve-block 107, the high and low pressure reservoirs 40 and 41, and their interior pipes 42 and 43 connected with said valve-block and communicating with the liquid in the reservoirs, substantially as and for the purpose set forth.

58. In a gun-carriage, the combination of a compound press for controlling the movement of the gun, the high and low pressure reservoirs 40 and 41, and their communicating pipes 42 and 43 with said valve-block 107, and the pipes 30 and 31 communicating between said valve-block and the pistons of the compound press, as and for the purpose explained.

59. In combination with a recoil gun-carriage; a rotating cylinder 14 connected thereto and containing a reservoir for storing the work of recoil, having a spring-bearing 233 to aid in supporting it, substantially as and for the purpose set forth.

60. In combination with an elevating gun-carriage, a rotary cylinder 14 connected thereto and containing a compound press, having a stationary press-cylinder 27, with its contained stationary piston 24, and a movable piston 23, working in the cylinder 27, and constituting a press-cylinder, for the piston 24, and having attached to it the three packings 177, 178 and 182, as and for the purpose set forth.

61. In an elevating gun-carriage, the combination of a compound press, reservoirs 40 and 41 each having communication with both pistons of said press and a valve-block 107, constructed with two pairs of valves, each of which pairs is arranged to control the communication between one of the pistons of the compound press and both reservoirs, substantially as and for the purpose explained.

62. In an elevating gun-carriage, the combination of cylinder 14, containing a hydraulic press and high and low pressure reservoirs having communication with said press, a pair of valves controlling such communication and a supplementary resistance-valve 234 also in said communication, substantially as and for the purpose set forth.

63. In an elevating gun-carriage, the combination of a hydraulic press, high and low pressure reservoirs, communicating passages between said press and reservoirs and valves $136^a$, $138^a$, controlling said passages; the valve $136^a$ being in the passage to the high-pressure reservoir and having a loading-spring, whereby it may be loaded to automatically operate as a resistance to the flow of liquid during recoil, substantially as explained.

64. In an elevating gun-carriage, the combination of a hydraulic press, high and low pressure reservoirs communicating passages between said press and reservoirs and valves $136^a$ $138^a$, controlling said passages; the valve $136^a$ being in the passage to the high-pressure reservoir and having a loading-spring, whereby it may be loaded to automatically operate as a resistance to the flow of liquid during recoil, and a supplementary valve 234, having a stem $234^a$, by which it may be adjusted to supplement the resistance of valve $136^a$, substantially as explained.

65. In a gun-carriage, the combination of a hydraulic press, a pressure-reservoir, and a valve $136^a$, constructed with a guiding-sleeve 424, the loading-spring 425, adjusting-screw 427, a screw-sleeve 426 with the stud 428 which prevents the sleeve 426 from rotating, and indicates the load on the spring 425, substantially as explained.

66. In an elevating gun-carriage, the combination of a hydraulic press, high and low pressure reservoirs, a pair of automatically-closing valves 136, 138 controlling the passage between the high and low pressure reservoirs and the press, trip-rods 150, 152 to open said valves, substantially as and for the purpose set forth.

67. In an elevating gun-carriage, the combination of a compound press, high and low pressure reservoirs, two pairs of automatically-closing valves 136, 138 and $136^a$, $138^a$, controlling the passage of liquid between either cylinder of the press and the high and low pressure reservoirs, and the trip-rods 150, 152, and 151, 153, substantially as and for the purposes explained.

68. In an elevating gun-carriage, the combination of a compound press and high and low pressure reservoirs, passages communicating between said reservoirs and each cylinder of the press; two pairs of valves controlling said passages, and a pair of trip-rods, 152, 153, for opening either of the two low-pressure valves and allowing the liquid from one press-cylinder to flow into the low-pressure reservoir, while that from the other cylinder flows into the high-pressure reservoir until the recoil of the gun is sufficiently checked, when the other low-pressure valve s tripped, allowing the gun to descend to loading position, substantially as explained.

69. In an elevating gun-carriage, the combination of the compound press, the high and low pressure reservoirs, passages communicating between said reservoirs and each cylinder of the press, two pairs of valves controling said passages, and a pair of trip-rods 150, 151, for operating respectively the high-pressure valves 136, 136ª, by the use of which either cylinder of the compound press may be used to raise the gun to firing position, while the other cylinder of the press will be filled from the low-pressure reservoir, by the automatic opening of one of the valves, 138, 138ª, substantially as described.

70. In an elevating gun-carriage, the combination of a hydraulic press, high and low pressure reservoirs having communication with said press, valves for controlling such communication and means for controlling said valves, consisting of the trip-rods, eccentric-shafts having pitman connections with the trip-rods, and handles for turning said shafts, as and for the purpose explained.

71. In combination with a recoil gun-carriage, a hydraulic press 242, having working connection with said carriage to rotate it, a hydraulic recoil-press and a pressure-reservoir arranged to receive and store work performed by the recoil of the gun, and having suitable communications with said press, for the purpose explained.

72. The combination with a gun and its mount, with means operated upon the discharge of the gun to store power, means whereby a portion of said power may be applied to train the gun, and means whereby a portion thereof may be applied to elevate and depress the gun.

73. In combination with a recoil gun-carriage, a hydraulic press 242, having working connections with said carriage to rotate it, a rotating cylinder 14, and a pressure-reservoir located in said cylinder, and having suitable connections with said press to operate it, as and for the purpose explained.

74. In combination with a recoil gun-carriage, a hydraulic press 242, having working connections with said carriage, to rotate it, a hydraulic recoil-press and a pressure-reservoir located on said carriage, arranged to receive and store work performed by the recoil of the gun and having suitable connections with said press 242 to operate it, as and for the purpose explained.

75. In combination with a recoil gun-carriage, a hydraulic press 242, having working connections with said carriage to rotate it, a rotating cylinder 14, and a pressure-reservoir located in said cylinder arranged to receive and store work performed by the recoil of the gun and having suitable connections with said press to operate it, as and for the purpose explained.

76. In combination with a recoil gun-carriage, having adjustable connections for controlling the angle of elevation of the gun, a hydraulic press 242, for adjusting said connections, a hydraulic recoil-press, a pressure-reservoir adapted to receive and store work performed by the recoil of the gun and having suitable connections with the said hydraulic press, and a rotating shaft 80 suitably connected to the said press and to the elevating mechanism for the purpose explained.

77. In combination with a recoil gun-carriage, suitable hand training mechanism for rotating said carriage, a hydraulic press 242, also having working connections for horizontal training of the gun, a hydraulic recoil-press and a pressure-reservoir arranged to receive and store work performed by the recoil of the gun, and having suitable connections with the training-press 242, to operate it, as explained.

78. In combination with a recoil gun-carriage, a hydraulic press 242, a hydraulic recoil-press, a high-pressure reservoir adapted to store the work of recoil, connected with said presses; said press 242 having suitable connection to rotate the carriage for horizontal training.

79. In combination with a recoil gun-carriage having suitable hand mechanism for controlling the angle of the elevation of the gun and a hydraulic press 242, also having working connections for controlling the angle of elevation of the gun, a hydraulic recoil-press, a pressure-reservoir, adapted to receive and store work performed by the recoil of the gun, and having suitable connections with said hydraulic press 242 for controlling it, and a shaft 80 suitably connected to the elevating mechanism of the gun and arranged to be driven by the said hand mechanism and by the said press, substantially as explained.

80. In combination with a gun-carriage, having adjustable connections for controlling the angle of elevation of the gun by hand, and suitable mechanism for the horizontal training of the gun, a hydraulic recoil-press and storage-reservoir, a hydraulic press 242, arranged to operate both the elevating mechanism and the horizontal training mechanism, substantially as explained.

81. In combination with a recoil gun-carriage, having adjustable connections for controlling the angle of elevation of the gun by hand, and suitable mechanism for the horizontal training of the gun, a hydraulic recoil-press, a hydraulic press 242, arranged to operate both the elevating mechanism and the horizontal training mechanism and a pressure-reservoir suitably connected to said presses and adapted to receive and store work performed by the recoil of the gun, substantially as explained.

82. In combination with a recoil gun-carriage, a hydraulic recoil-press, a hydraulic press 242, a pressure-reservoir arranged to store work performed by the gun in recoiling, and having suitable communications with said press 242 to operate it, a shaft 408, having working connection with said press 242, by which it is operated, and means in connection with said shaft for performing work, such as loading the gun as explained.

83. In combination with a recoil gun-carriage, a pressure-reservoir arranged to receive and store work performed by the gun in recoiling, a hydraulic press 242, with which said reservoir communicates to operate it, a turning-shaft 408, driven by said press, a winding-drum on said shaft, and a working cable 410 411, driven by said drum, and available for performing work, as explained.

84. In a gun-carriage, the combination of the valve-block 107, the press 242, the block 266 secured to the said valve-block and press, with passages therein arranged to conduct liquid to and from the press, substantially as explained.

85. In a gun-carriage, the combination of the double-acting press 242, connected to a suitable source of power, having positive connection with the carriage-rotating mechanism and arranged to move the carriage in one direction only when the piston moves forward, and in the opposite direction when the piston moves backward, as explained; said hydraulic press having a suitable cylinder and a long-stroke piston connected to the rotating gear, whereby a single stroke, in either direction, gives sufficient momentum to the carriage to cause it to rotate by inertia to the position desired, and thereafter, by slight and steady continuous flow of the liquid into the press, forces the gun slowly and steadily to follow a moving object.

86. In a recoil gun-carriage having a hydraulic recoil-press, the combination of a power-reservoir adapted to receive and store work performed by the recoil of the gun, a double-acting hydraulic press 242, having suitable connections with said reservoir and positive connection between the press 242 and the horizontal training mechanism, whereby the latter is moved in both directions, as explained.

87. In a recoil gun-carriage having a hydraulic recoil-press, the combination of a reservoir adapted to receive and store work performed by the recoil of the gun, a double-acting press 242, having suitable connections with said reservoir to be operated in both directions thereby, and positive connections between the press 242 and the horizontal training mechanism, whereby the latter is moved in both directions, as explained.

88. In a recoil gun-carriage, having a recoil-press, the combination of a reservoir located on said carriage, adapted to receive and store work performed by the recoil of the gun, a double-acting hydraulic press 242, also located on said carriage having suitable connections with said reservoir, and positive connection between the press 242 and the horizontal training mechanism, whereby the latter is moved in both directions, as explained.

89. In a gun-carriage, the combination of a double-acting press 242, the two pairs of passages communicating with opposite sides of the piston, and the pair of high-pressure valves $250^a$, $250^b$, and the pair of low-pressure valves $251^a$, $251^b$, with their operating-stems, 252, 253, as and for the purpose explained.

90. In a gun-carriage, the combination of the double-acting press, and its valves for controlling the flow of liquid to and from the opposite sides of the piston, the valve-stems, 252, 253, and the reversible driving-shaft 320, having the cranks 326, 327, with which the stems 252, 253, are connected, and means for controlling the same, substantially as and for the purpose explained.

91. In a recoil gun-carriage, the combination of a pressure-reservoir arranged to receive and store work performed by the gun in recoiling, the press 242, having a communicating passage from the reservoir, a valve 238 having a stem $238^a$ in said passage to regulate the flow of liquid in the same, a shaft 283 having an eccentric 282, and the pitman 287 connected with the stem $238^a$, and with the eccentric 282, as and for the purpose explained.

92. In a rotating gun-carriage, the press 242, having the piston-rod 244, a rack 317, pinion 358, a driving-shaft 366, having a clutch connection to which pinion 358 is geared, and the traversing wheel 376, operating as and for the purpose explained.

93. In a rotating gun-carriage, the combination of the traversing wheel, 376, its driving-shaft 366, and the friction-clutch for making connection between said shaft and a suitable source of power and consisting of the geared sleeve 365, the longitudinally-movable coöperating disk 369 for driving the shaft 366, the bar 370, for moving the disk and the operating-screw 371, within the shaft 366 for forcing the disk 369 against sleeve 365, as and for the purpose explained.

94. In combination with the traversing wheel, 376, of a stationary rotating gun-carriage, the rotating shaft 366, on which said wheel is fixed against turning, the friction-brake consisting of a non-rotating member 383, the bearing-disk 382 rotating with the shaft 366, and having means for forcing it against the member 383, for checking the movement of the carriage, as explained.

95. In combination with the traversing wheel 376, of a rotating gun-carriage, the rotating shaft 366, upon which it is mounted, and suitable driving mechanism to rotate the shaft; the two interposed clutches arranged respectively for driving and braking the movement of the shaft and the traverse-wheel and the single forcing-rod 371 arranged to operate the respective clutches, as explained.

96. In combination with the traverse-wheel 376 of a rotating gun-carriage, and the rotating shaft 366 upon which it is mounted and suitable driving mechanism to rotate the shaft; a clutch for controlling the movement of said shaft and traverse-wheel, and the forcing-rod 371 with right and left hand threads operating the fixed nut 374 and the movable clutch-operating block 370, as and for the purpose explained.

97. In a rotating gun-carriage, the combination with the traversing-wheel, 376 and its shaft 366, of the adjustable load-bearing beam 390, in which the shaft is mounted and elastically connected to the carriage, as and for the purpose explained.

98. The combination with the traversing wheel 376, of a rotating gun-carriage, and the shaft 366 on which it is mounted; of the load-bearing beam 390 constructed to have elastic action, having a bearing for said shaft and suitably connected with the carriage, for the purposes explained.

99. In a gun-carriage, the combination with the traversing wheel 376 and the shaft 366 upon which it is mounted, of the load-bearing beam 390, adjustably secured to the carriage by the elastic rods 399 on opposite sides of shaft 366, as and for the purposes explained.

100. In a rotating gun-carriage, the combination of the traverse-wheel 376, the shaft 366 upon which said wheel is mounted, and having a bearing in a beam 390 arranged to rock or tip easily for the purpose of keeping the bearing normal to the shaft, as the latter bends under the load imposed to secure traction of the traverse-wheel, as explained.

101. In combination with a rotating gun-carriage having means for rotating it, the traversing wheel 376, a shaft 366 through which traversing movement is transmitted from the wheel to the carriage, having at is inner end a ball-and-socket bearing between said shaft and carriage for the purpose of reducing the friction due to the longitudinal thrust in the shaft and the bending of the shaft by the load put on the traversing wheel, as explained.

102. In a gun-carriage, the combination of the elevating-links 78, pinions 79 and their racks for operating the links, suitable gearing to drive the pinions, and the friction locking device, consisting of the shaft 337, the driving-pinions 336, keyed on said shaft, the threaded shaft 348, with the jam-heads 346, 347, arranged to force the pinions 336 against the ends of the shaft 80, and lock them by friction, as explained.

103. In a gun-carriage, the combination of the driving-shaft 80, pinions 79, on said shaft, shaft 337, having pinions 336 keyed thereon and suitably geared to drive shaft 80, and the locking device consisting of the interposed locking-pieces 342, 343 fixed against rotation, jam-heads 346, 347 and shaft 348 connecting said heads, and by means of which locking-pieces 342, 343 doubly lock the pinions 336, by friction, as explained.

104. In a gun-carriage, the combination with the pinions 336 and their driving-shaft 337, of the frictional locking device, consisting of the concentric shaft 348, spline 349, securing the shaft 348 against rotation in the shaft 337 and the locking-nuts 346, 347, by means of which the pinions are locked when either of said nuts is tightened, as explained.

105. In a gun-carriage, the combination of suitable hand mechanism having a rotating shaft 334 for controlling the angle of elevation of the gun, a friction-clutch mounted on said shaft, a hydraulic press 242, suitably geared with one member of said clutch to drive the shaft 334, as explained.

106. In a gun-carriage, the combination of the hydraulic press 242, the hand mechanism for controlling the angle of elevation of the gun having a shaft 334, and a friction-clutch consisting of the sleeve 413 mounted loosely on shaft 334, and suitably geared to be driven by said press, the disk 416 keyed to shaft 334, by a key-block 414 and screw 418 which forces parts 413 and 416 together through the medium of said key-block, as explained.

107. In an elevating gun-carriage, the combination of the rotating supporting-cylinder 14, a link system for elevating the gun, and a carriage-body 64, upon which the link system is mounted and which is firmly secured to the cylinder 14, for the purpose set forth.

108. In an elevating gun-carriage, the combination of a cylinder 14, containing springs and having a movable piston against which the springs act to lift the gun and which is provided with passages 124$^a$, through which liquid is forced during the lowering of the gun, and suitable stop-rods 224 to regulate the size of the said passages, as and for the purpose set forth.

ALBERT H. EMERY.

In presence of—
HERVEY S. KNIGHT,
M. E. OURAND.